United States Patent [19]
Fenn

[11] Patent Number: 4,642,017
[45] Date of Patent: Feb. 10, 1987

[54] AUTOMATED IN-PROCESS PIPE STORAGE AND RETRIEVAL SYSTEM

[75] Inventor: Ronald L. Fenn, Hudson, Ohio

[73] Assignee: AMCA International Corporation, Hanover, N.H.

[21] Appl. No.: 430,746

[22] Filed: Sep. 30, 1982

[51] Int. Cl.$^4$ ............................................. B65G 1/10
[52] U.S. Cl. .................... 414/348; 212/210; 212/218; 414/21; 414/43; 414/71; 414/74; 414/273; 414/542; 414/608; 414/748
[58] Field of Search ..................... 414/21, 28, 43, 70, 414/71, 74, 97, 122, 134, 136, 266, 273, 281, 286, 348, 542, 608, 745, 748, 910; 212/210, 218, 220

[56] References Cited

U.S. PATENT DOCUMENTS

| | | | |
|---|---|---|---|
| 1,940,242 | 12/1933 | Burgess | 414/608 |
| 2,864,516 | 12/1958 | Rogers . | |
| 3,043,452 | 7/1962 | Spillios | 414/286 |
| 3,045,846 | 7/1962 | Clark . | |
| 3,071,262 | 1/1963 | Bosch et al. . | |
| 3,091,353 | 5/1963 | Allard . | |
| 3,334,224 | 8/1967 | Allen et al. . | |
| 3,343,692 | 9/1967 | Arnot . | |
| 3,402,836 | 9/1968 | Derbrey et al. . | |
| 3,426,922 | 2/1969 | Massey | 414/21 |
| 3,438,489 | 4/1969 | Cambornac et al. | 414/134 X |
| 3,467,264 | 9/1969 | Armington et al. | 414/785 X |
| 3,487,964 | 1/1970 | Riley . | |
| 3,497,084 | 2/1970 | Murrah | 414/21 |
| 3,595,412 | 7/1971 | Billingsley . | |
| 3,631,993 | 1/1972 | Young . | |
| 3,690,479 | 9/1972 | Castaldi . | |
| 3,700,128 | 10/1972 | Noble et al. | 414/273 X |
| 3,719,287 | 3/1973 | Billingsley et al. . | |
| 3,746,189 | 7/1973 | Burch et al. . | |
| 3,779,403 | 12/1973 | Young . | |
| 3,812,987 | 5/1974 | Watatani . | |
| 4,006,828 | 2/1977 | Hill . | |
| 4,018,349 | 4/1977 | Hupkes | 212/210 X |
| 4,039,785 | 8/1977 | Ziemann | 221/129 X |
| 4,053,741 | 10/1977 | Ainoya et al. . | |
| 4,106,639 | 8/1978 | Montgomery et al. . | |
| 4,136,789 | 1/1979 | Houwer . | |
| 4,204,788 | 5/1980 | Massey | 414/21 |
| 4,215,342 | 7/1980 | Horowitz . | |
| 4,439,099 | 3/1984 | Asari et al. | 414/45 X |

FOREIGN PATENT DOCUMENTS

| | | | |
|---|---|---|---|
| 1804928 | 5/1970 | Fed. Rep. of Germany | 414/74 |
| 2230715 | 1/1974 | Fed. Rep. of Germany | 414/30 |
| 446825 | 5/1936 | United Kingdom | 414/281 |

OTHER PUBLICATIONS

The Morgan Engineering/AMCA International Corporation brochure.

*Primary Examiner*—Leslie J. Paperner
*Attorney, Agent, or Firm*—Renner, Otto, Boisselle & Lyon

[57] ABSTRACT

An automated storage and retrieval system for use at a pipe manufacturing facility includes a computer and memory; a storage/retrieval crane operable in a storage yard; a plurality of containers, each being capable of containing material for storage and a load crane for at least one of loading or unloading respective containers. The computer is on-site proximate the storage yard and includes means for monitoring and controlling the storage/retrieval crane and load crane, means for monitoring and storing in memory information of container positions in the storage yard and means for coordinating operation of the storage/retrieval crane and load crane. The crane stores and retrieves containers in the yard in a three dimensional array, can carry containers on the crane feet, and may deliver or retrieve containers relative to load/unload stations including a load crane. At such stations pipe is transferred between containers and the load crane. Moreover, a center of gravity alignment feature at such stations balances pipe in the containers. A footer support system reinforces the storage facility floor where containers are placed thereby minimizing overall floor carrying capacity requirements.

13 Claims, 16 Drawing Figures

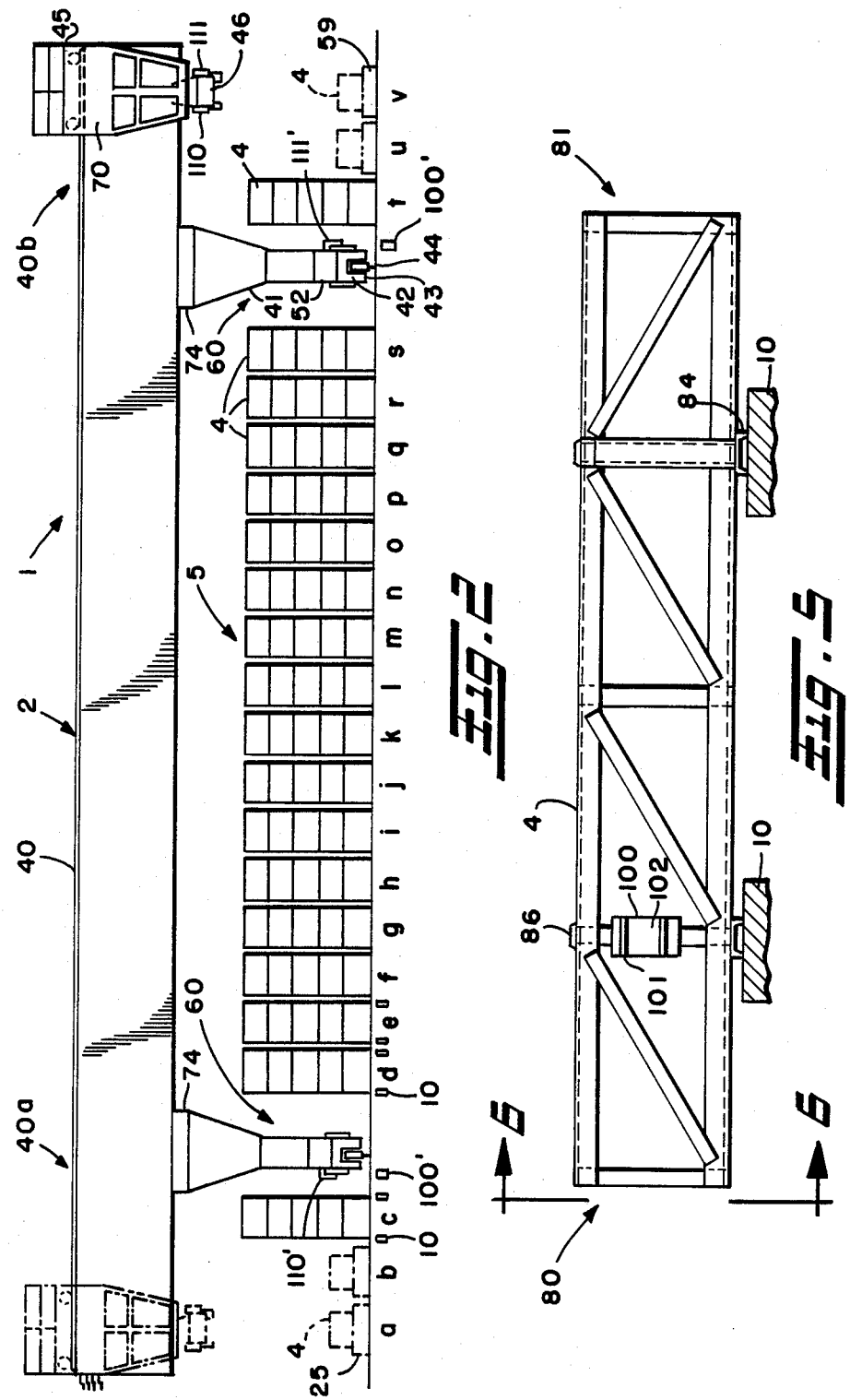

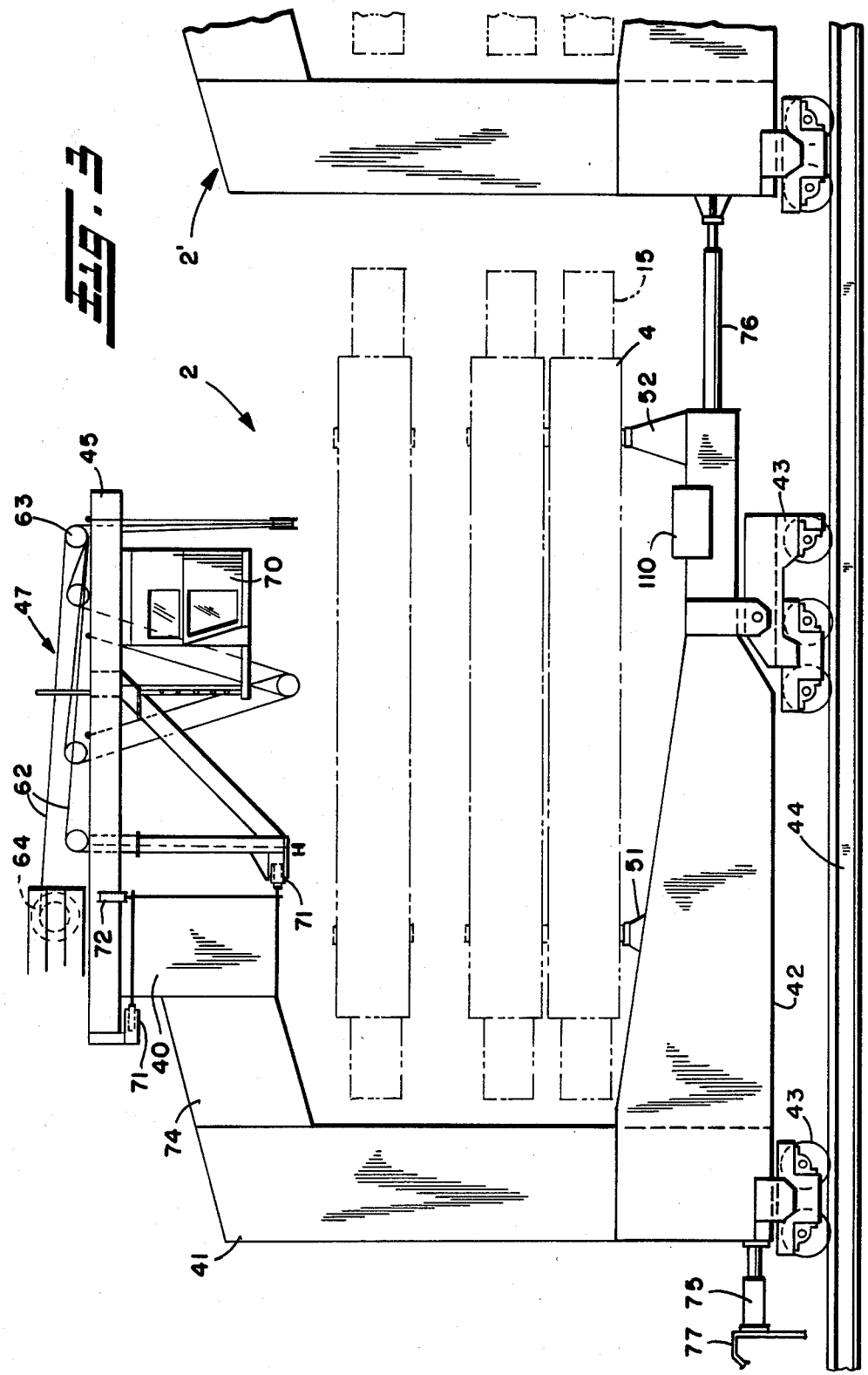

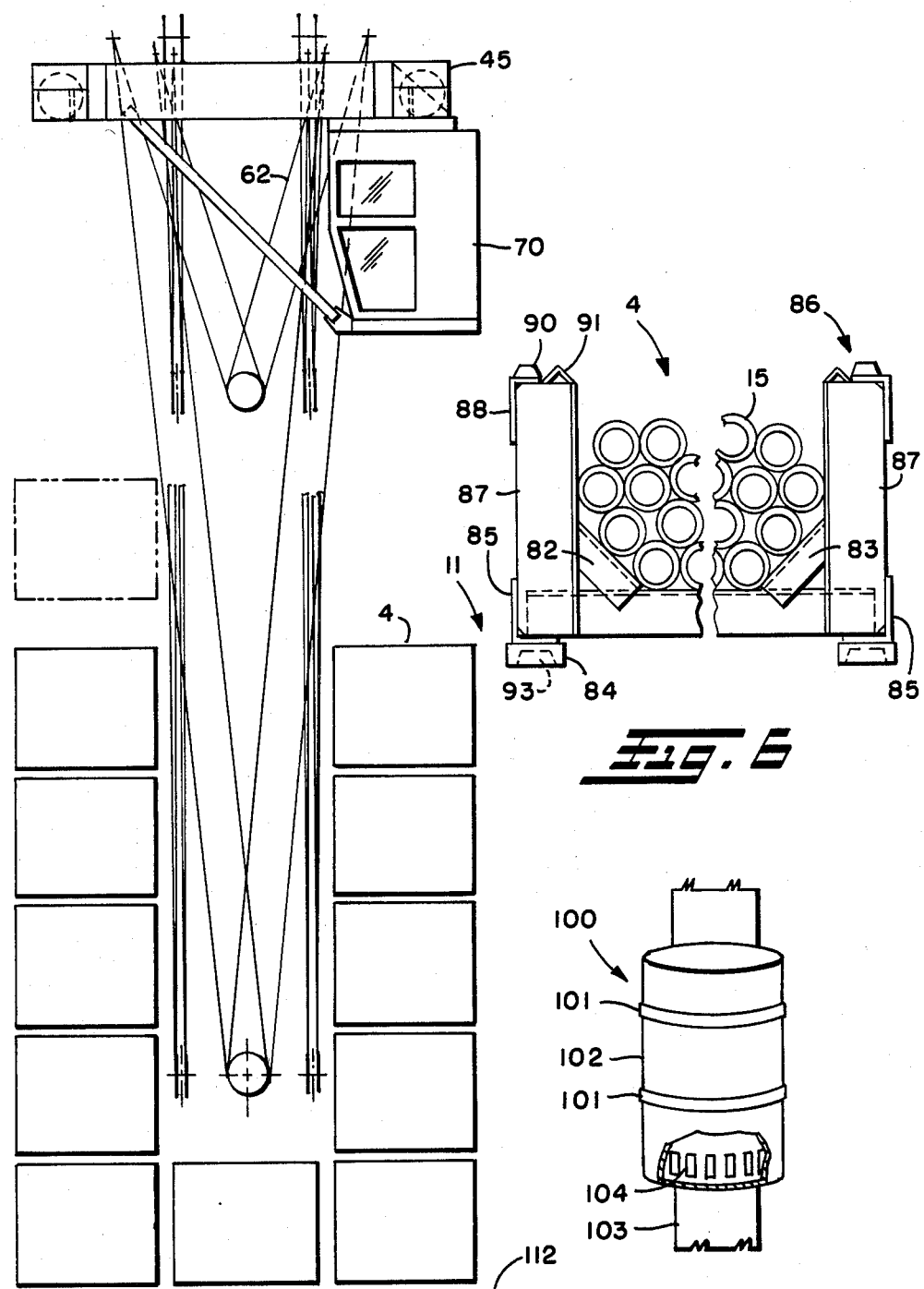

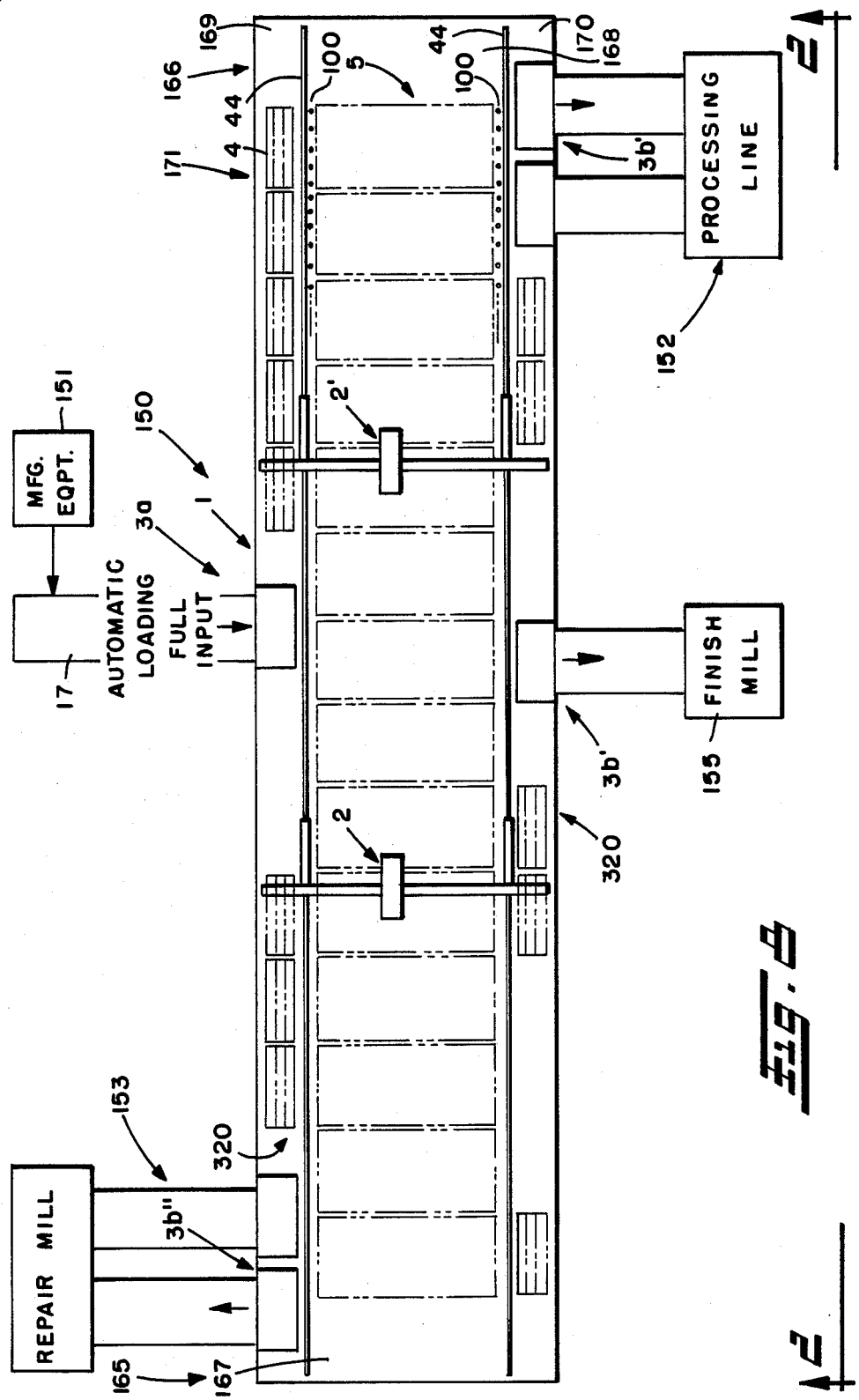

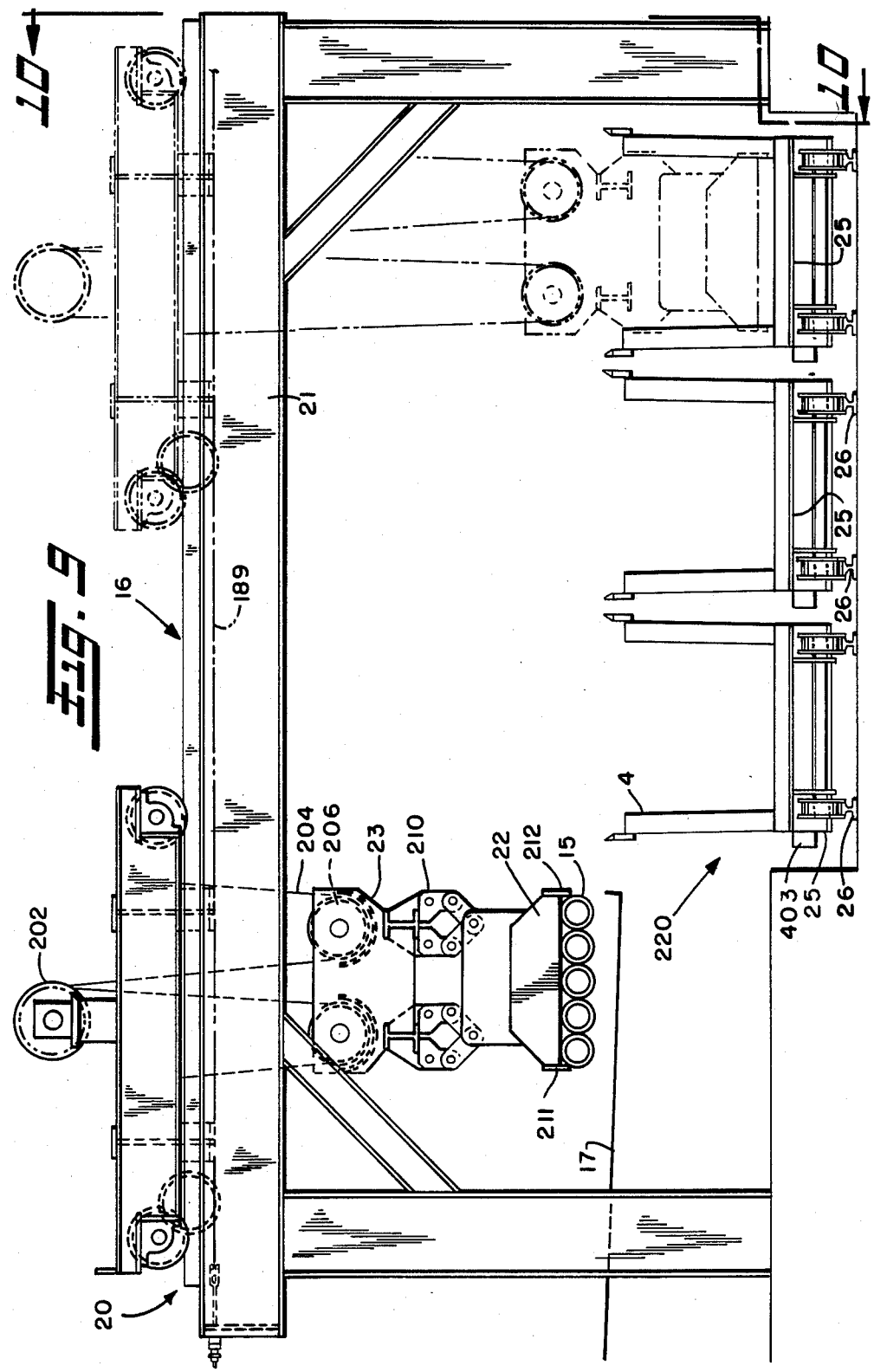

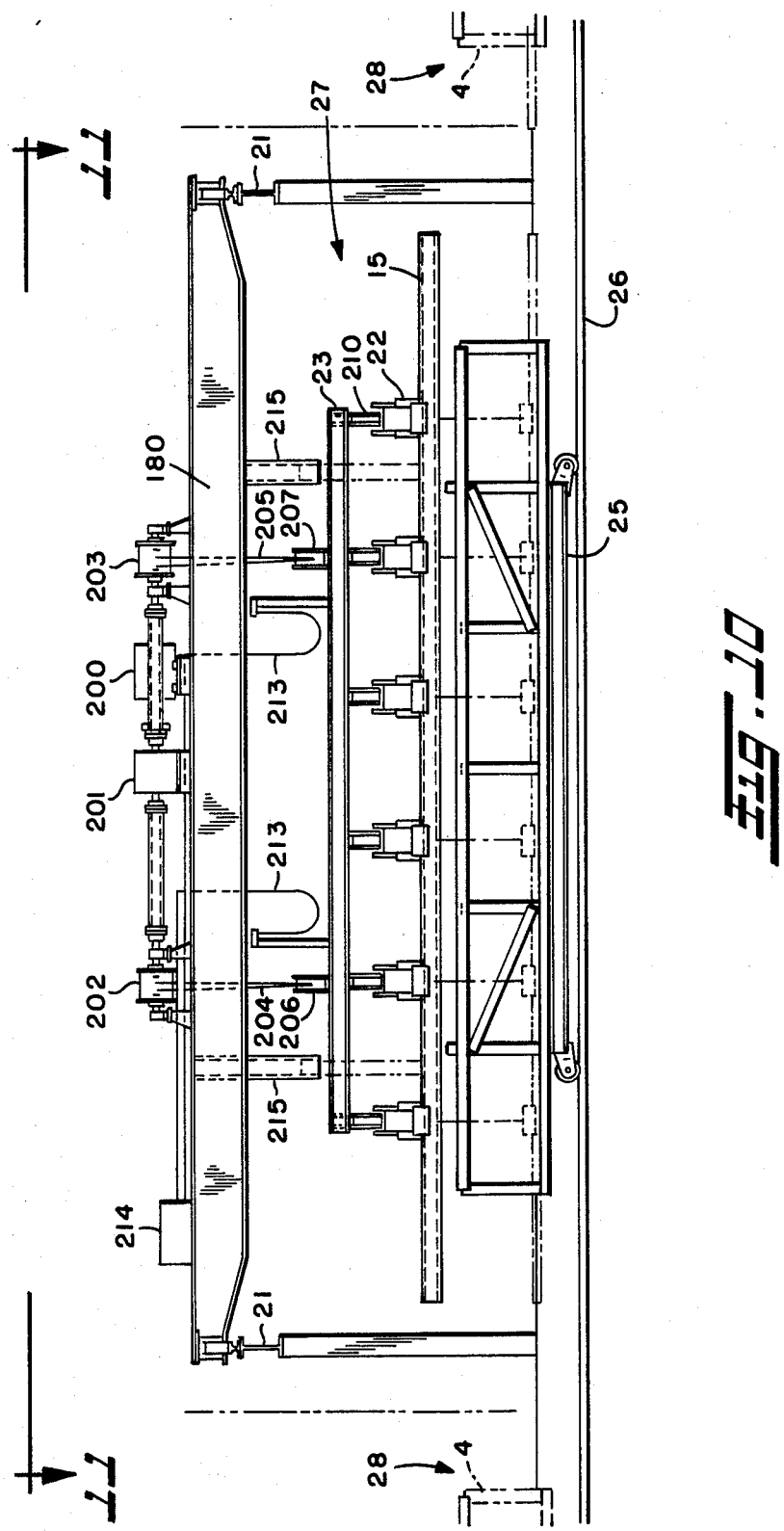

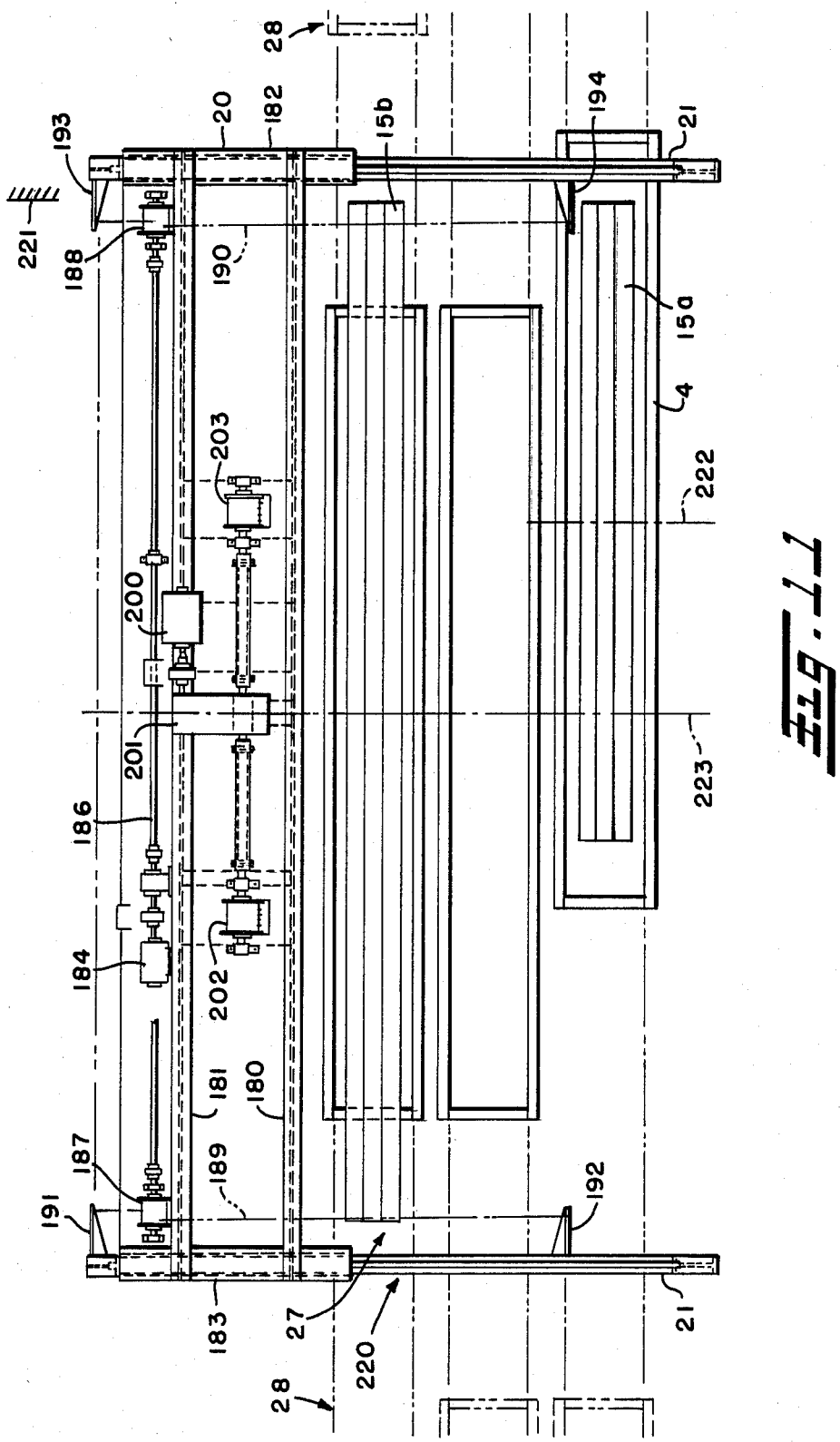

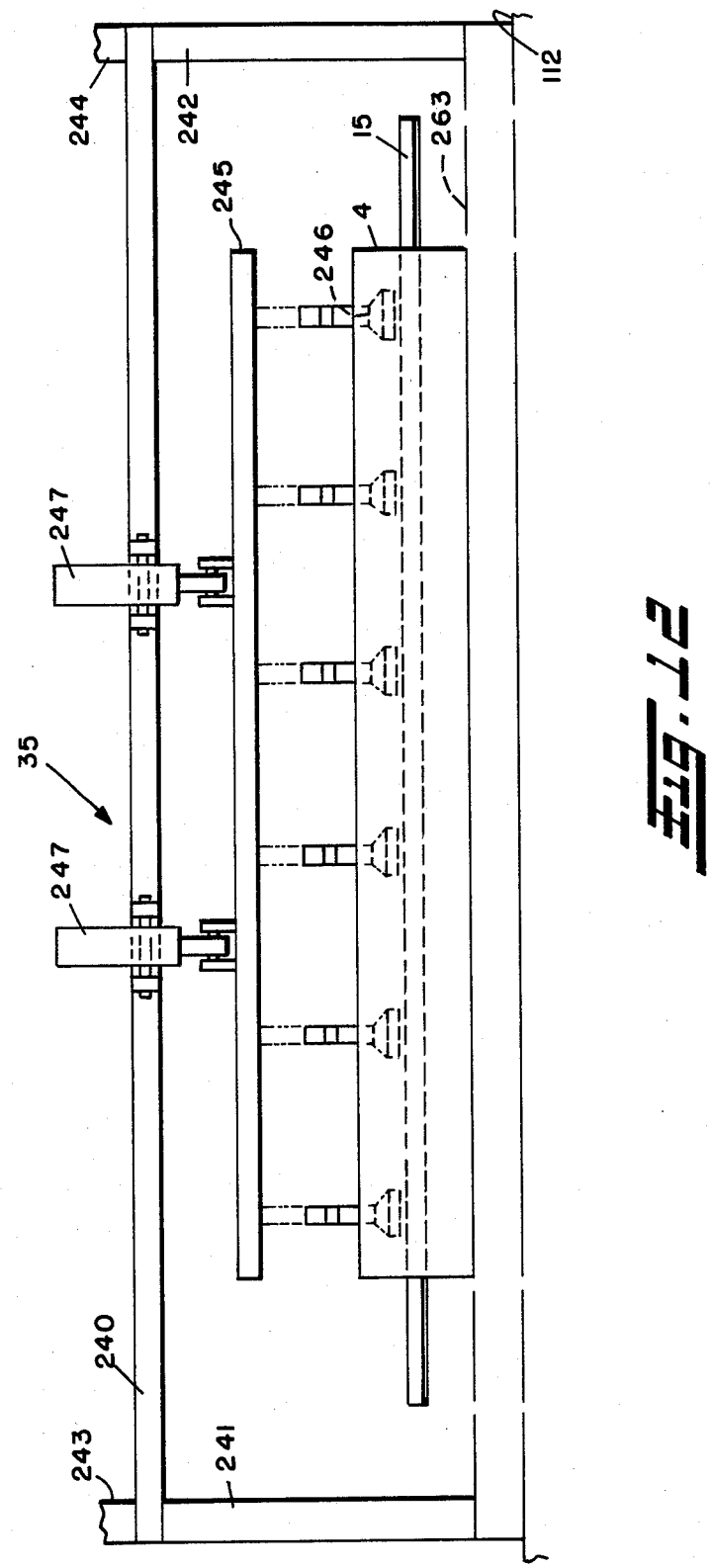

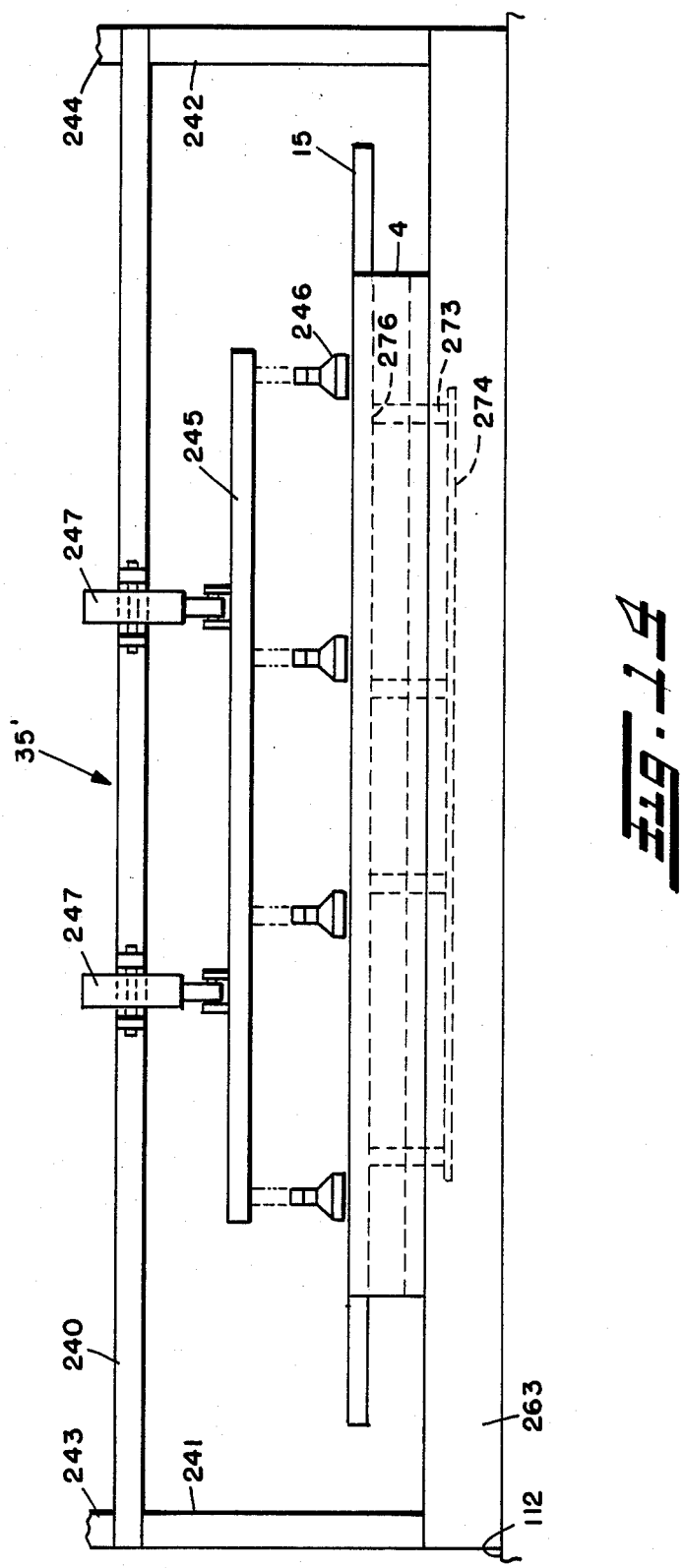

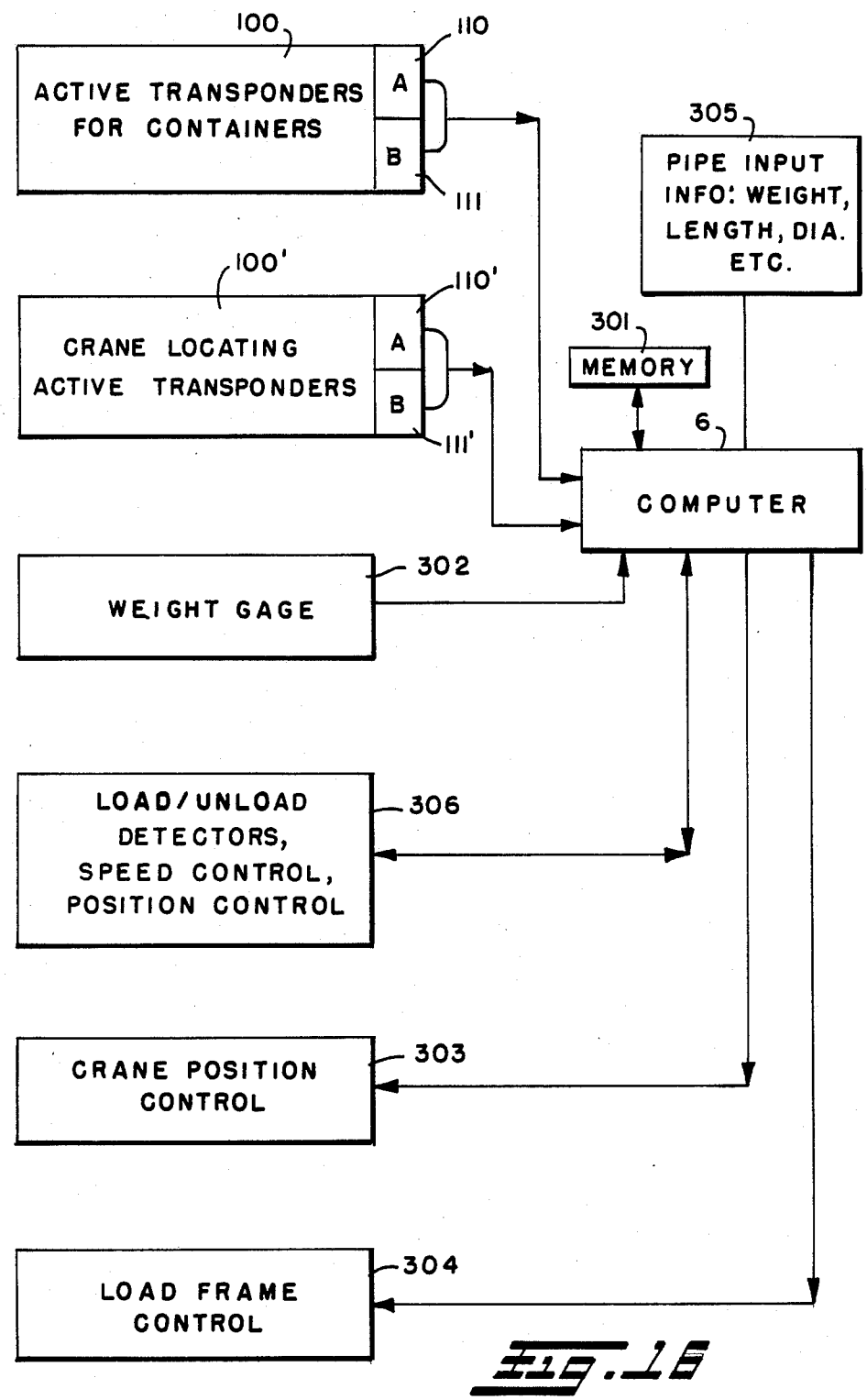

AUTOMATED IN-PROCESS PIPE STORAGE AND RETRIEVAL SYSTEM

TECHNICAL FIELD

The present invention relates generally, as indicated, to material storage and retrieval and, more particularly, to automated storage and retrieval of elongate material, such as pipes, bars, rods and the like. Moreover, the invention relates to an automated in-process storage and retrieval system for such elongate material.

BACKGROUND OF PRIOR ART

One factor limiting speed of production of pipes is the time required to remove the pipes from the production facility and to store the pipes for subsequent processing, use, shipment, etc. Another limiting factor in delivering pipes, for example, to a customer is the accuracy and facility with which the pipes can be identified, located and shipped from a storage yard.

One system for expediting material flow and storage from tube processing equipment is disclosed in U.S. Pat. No. 4,252,486. Storage of tubes in that system is on relatively immobile racks formed by cantilever arms. At least some of those arms have spacers for separating adjacent tubes. A disadvantage to such system and others served by stacker cranes, elevators or the like, is the limited dimensions of the shelving or storage compartments which are typically in a two dimensional array on one side or two sides of the stacker crane, elevator, etc.

Another example of a prior high shelf storage apparatus for pipes is disclosed in U.S. Pat. No. 4,063,653. In the system of the '653 patent an elevator carries cassette-like containers of pipes to individual compartments of a storage building.

Stackable storage racks disclosed in U.S. Pat. No. 3,157,424 are another approach for storing pipes in a storage area.

U.S. Pat. Nos. 4,039,785 and 4,109,808 disclose computer controls for automating control of stacker type cranes used in article handling systems.

BRIEF SUMMARY OF THE INVENTION

The present invention is disclosed herein with reference to the preferred embodiment relating to the handling and storage of pipes. Storage may be in a true three dimensional array only limited by the safe height that stackable storage containers may be stacked on one another, the size of the storage yard, and the size of the storage/retrieval crane. The pipes may be of various diameters, wall thicknesses and lengths, although in most instances it is contemplated that the pipes are elongate meaning that length exceeds diameter. However, it will be appreciated and is to be understood that the invention may be used to facilitate handling and storage of other types of material, especially that of elongate type. Examples of other elongate type material include tubes, rods, bars, beams, strips, and so on. Although the invention is described in detail below with respect to the handling, storage and retrieval of pipes, the other materials mentioned herein and similar materials, as is evident from the disclosure, may be considered equivalent to pipes. Features of the invention also may be used to handle, to store and to retrieve materials that are not elongate.

According to one aspect of the invention an automated storage and retrieval system includes a computer, a memory, a storage/retrieval crane operable in a storage yard, and a plurality of containers. The containers are for material storage. The computer is on-site proximate the storage yard and includes means for monitoring and controlling the storage/retrieval crane and means for monitoring and storing in the memory information of container positions in the storage yard. The computer may be of the distributed intelligence type. In one embodiment plural storage/retrieval cranes are employed to expediate storing and retrieving material relative to the storage yard. The plural cranes may be used in a pitch-catch transferring technique transferring containers from one crane to the other efficiently using vacant storage positions in the storage yard under control of the computer. Another feature increases the number of containers a storage/retrieval crane can carry safely by providing elongate feet on the crane legs with container support pads on such feet to carry containers thereon. According to a further feature, transducers (transponders) along the storage/retrieval crane travel path provide discrete information concerning crane location to permit accurate control of crane position by the computer.

A load station preferably also controlled by the computer is another aspect of the invention. Preferably the computer coordinates operation of the storage/retrieval crane and one or more load cranes used to transfer pipes between a load zone and one or more containers. In one embodiment the load crane is an overhead crane and in another embodiment the load crane is a tilt crane. A feature of the load station is the aligning of one end of each pipe with an alignment guide and the corresponding aligning, preferably under control of the computer, of the center of gravity of a container with respect to the center of gravity of the pipes to be transferred therein to obtain substantial centering of the pipes in the container. Another feature of the load station is a shuttle apparatus preferably using plural shuttle cars to expedite moving material between the process line and the storage retrieval crane by shuttling containers with respect to the load crane and/or a temporary storage zone accessible to the storage/retrieval crane. Further features of the load station include the combination of a sloped table on which the pipes may roll and a magnetic pick-up for the load crane; and the use of plural spaced apart magnets of such pick-up to help assure that each pipe will be grabbed by plural magnets.

According to an additional aspect of the invention, independent support footers are provided in a storage yard for supporting respective containers preferably in stacked relation without requiring direct support by a storage yard floor; as a corollary there may be placement of the containers directly on the storage yard floor aligned in position with discrete independent support footers beneath such floor, thus minimizing the floor strength capacity requirement. Preferably discrete transponders identify the individual containers and the transponder system may be used to identify the facing direction of the respective containers. The weight of each container may be measured each time the storage/retrieval crane lifts a container, and such weight information stored in the computer may be employed subsequently to confirm container identity and to quantify waste when a container is emptied of pipes at a defect correction facility and reloaded with defect-corrected pipes.

The foregoing and other aspects of the invention will become more apparent from the following description.

It is, accordingly, a primary object of the present invention to store and retrieve material.

Another object is to automate storage and retrieval of material.

An additional object is to improve efficiency of storage and retrieval of material.

A further object is to reduce the cost of the storage yard for containerized material.

Still another object is to improve the accuracy of position information and control with respect to a storage/retrieval crane.

Still an additional object is to improve the identification of containers for elongate material or the like.

Still a further object is to identify uniquely containers used for storage of elongate material or the like.

Even another object is to determine the amount of scrap in a finishing or repairing process for elongate material.

Even an additional object is to expedite a manufacturing process for elongate material, such as pipes, bars and the like.

Even a further object is to balance loads of elongate material delivered to containers.

Yet another object is to expedite delivery of circular crosssection members between conveying means and a container.

Yet an additional object is to assure secure holding of elongate members by a loading device therefor capable of handling elongate members of different lengths.

Yet a further object is to facilitate unloading elongate members from a container.

Still yet another object is to automate coordinated control onsite of a storage/retrieval system, especially employing plural storage/retrieval cranes, automated loading cranes, and container shuttle cars.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings, wherein like reference numerals designate like parts:

FIG. 2 is a front elevation of a storage and retrieval system according to the present invention;

FIG. 3 is a side elevation view of the storage/retrieval crane illustrated in FIG. 1;

FIG. 4 is a fragmentary view of the stabilized reaving system of the storage/retrieval crane;

FIG. 5 is a fragmentary side elevation view of a container used in the storage and retrieval system;

FIG. 6 is an end elevation view of the container of FIG. 4 with pipes therein;

FIG. 7 is an enlarged fragmentary view of a transponder attached to the container of FIG. 4;

FIG. 8 is a top plan view of the automated in-process pipe storage and retrieval system according to the present invention;

FIG. 9 is a side elevation view of the overhead crane load station;

FIG. 10 is a front elevation view of the overhead crane load station;

FIG. 11 is a top plan view of the overhead crane load station;

FIG. 12 is a side elevation view of the tilt crane load station;

FIG. 14 is a side elevation view of the tilt crane load station with a constant drop height mechanism insertable into respective containers;

FIG. 16 is a block diagram depicting inputs to and controls by the computer of the storage and retrieval system.

DESCRIPTION OF THE PREFERRED EMBODIMENT

Figure 1:
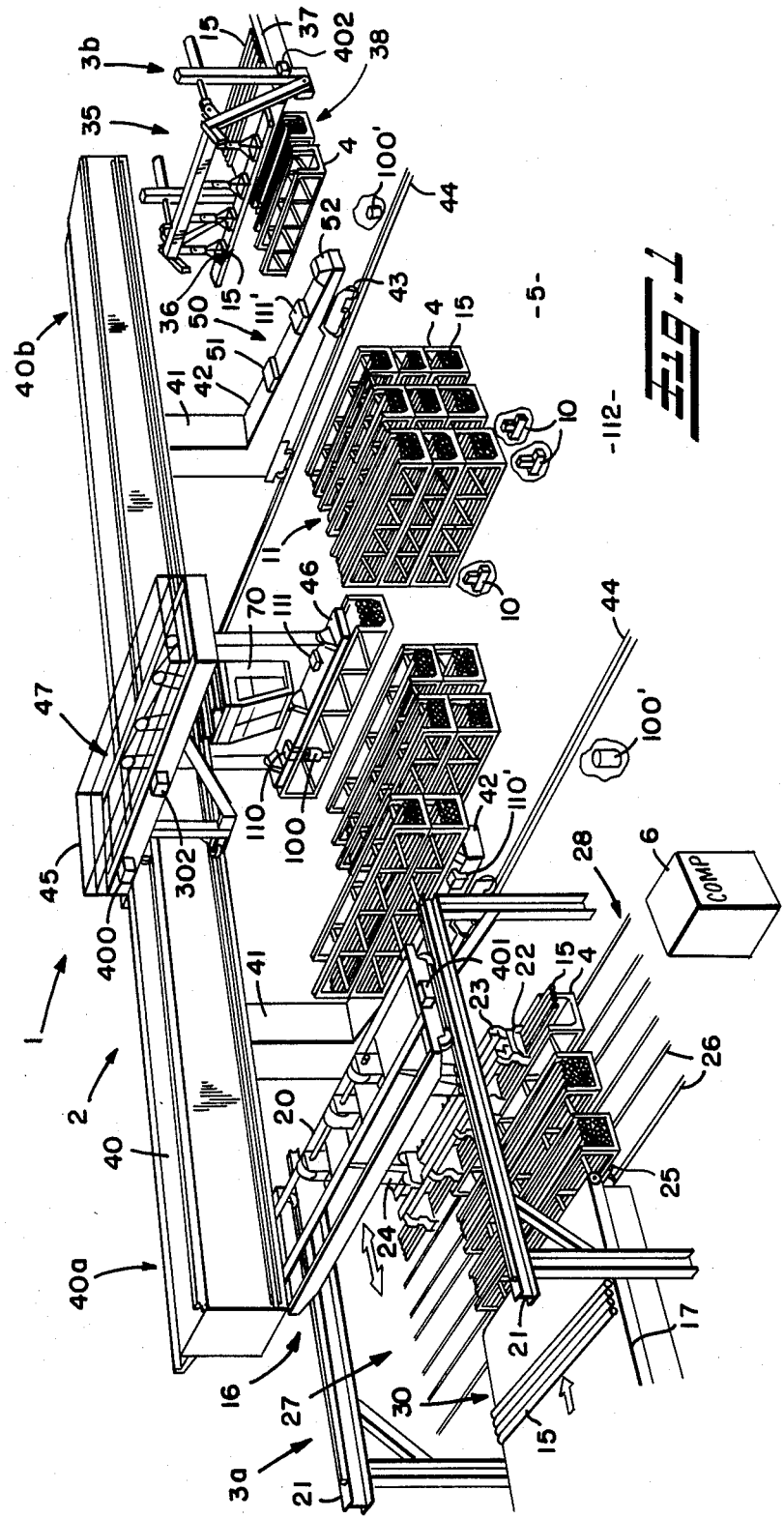
FIG. 1 is a fragmentary isometric view of the automated inprocess storage and retrieval system of the invention showing two types of load stations.

Referring now in detail to the drawings, wherein like reference numerals designate like parts in the several figures, and initially to FIG. 1, a storage and retrieval system in accordance with the present invention is generally indicated at 1. The fundamental components of the storage and retrieval system 1 include a storage/retrieval crane 2, one or more load/unload stations 3a, 3b, one or more containers 4, a storage yard 5, and a computer monitor and control system 6. It is the purpose of the storage/retrieval crane 2 to transport containers between respective locations at load/unload station(s) and the storage yard, as well as, for example, a shipping/receiving station (not shown). The computer 6, e.g., a DEC VAX MODEL, is on-site of the system 1 and is operative to control the storage/retrieval crane 2 to place or to retrieve containers with respect to the load/unload stations 3a, 3b, the yard 5 and the shipping/receiving station while also controlling the load/unload stations and coordinating control of such stations and of the crane 2, e.g., using distributed intelligence of MC 68000 microprocessor boards at various locations in the system 1. As is illustrated in FIG. 1, preferably the containers 4 may be stacked on one another for storage space efficiency without additional storage shelving, and preferably the yard 5 and storage/retrieval crane 2 are adequately large to enable storage of containers 4 in a three dimensional storage array. Such an array may extend for substantially the entire length and width dimensions of the yard 5 and may include a vertical dimension limited by the safe height that the containers 4 may be stacked on one another, the height of crane 2, etc. The computer 6 has adequate memory associated therewith for storing information concerning the location of each individual container 4 in the yard 5, for example, as well as inventory information concerning the material in respective containers.

Although the storage and retrieval system 1 would be able to place containers 4 at virtually any location in the yard at which there is adequate space, actual construction of the yard 5 can be facilitated and the cost reduced according to the invention by constructing at those locations where containers 4 are intended for placement adequate support footers 10, one of which is illustrated in FIG. 1. The support footers 10 may be, for example, conventional concrete footers capable of bearing the weight of a stack 11 of loaded containers 4. Typically, for example, four such footers 10 would be located at respective locations where corners or support points of one container 4 or a stack of containers would be expected to be placed. According to the preferred embodiment of the invention, such support footers 10 would be constructed at such respective locations in the yard 5. Thereafter, a concrete or other appropriate floor may be poured or otherwise installed in the yard 5, the support footers 10 providing supplemental support for such a floor particularly at the aforesaid specific locations. Using such a support system for the containers 4, then, the actual general load capacity of the yard floor may be reduced over that which would be necessary if sole support of the containers 4 or stacks 11 were required by the yard floor. Accordingly, using such support footers support system, the cost of constructing the yard floor can be substantially reduced.

As a further modification to the support footers system of the invention, the support footers may include pedestal portions extending above the yard 5 floor so that the containers 4 or stacks 11 thereof would be supported above such floor. In fact, using such pedestals, it may be possible to construct the yard 5 without a separate poured or otherwise constructed floor; rather, the floor may be natural earth, for example.

At the load/unload station 3a pipes 15 are loaded by a load/unload crane 16 from a feed table 17 into respective containers 4a. Alternatively, pipes 15 may be unloaded from respective containers 4a by the crane 16 for delivery to the or a similar feed table 17 that transports the pipes to another location, e.g. for further processing, repair, loading onto a truck, etc. The load/unload crane 16 is an overhead bridge crane having a movable trolley 20 supported by and movable along a pair of overhead rails 21. The pipes 15 actually are lifted by a grab including plural electromagnets 22 that are mounted on a load frame 23 supported by a reaving system 24 from the trolley 20. The load/unload station 3a includes a plurality of movable shuttle cars 25 on which respective containers 4a are supported. The shuttle cars 25 may be moved under control of the computer 6 along the rails 26 to move the containers between a load zone 27 beneath the load/unload crane 16 and a temporary storage zone 28 displaced from, i.e. on either side of, the crane 16 but accessible to the storage/retrieval crane 2. Preferably there are two shuttle cars on each of these parallel sets of rails, as is illustrated.

Preferably the feed table 17 is sloped with respect to horizontal in order to expedite delivering pipes from a source (not shown) thereof to a pick-up area 30 where the electromagnets 22 can pick up the pipes from the table 17. The combination of a sloped feed table 17 and magnetic grabbing mechanism for the pipes expedites transferring pipes to respective containers 4a. Likewise, such combination also facilitates transferring pipes from containers via the feed table 17 to other equipment (not shown), particularly when the feed table is sloped in a direction allowing the pipes to roll away from the pick-up area 30. Use of plural shuttle cars, preferably to enable placement of three containers 4a at the load zone 27, further expedites transferring pipes between the feed table 17 and containers 4a.

As is described in greater detail below, the computer 6 preferably monitors and controls position of the shuttle cars 25 and coordinates operation thereby with the various other portions, including the load/unload crane 16, of the load/unload station 3a and of the storage/retrieval crane 2, especially to optimize operating efficiency of the system 1. The computer 6 also controls the power delivered to the magnets 22.

The load/unload station 3b includes a tilting load/unload crane 35 with a plurality of vertically movable electromagnets 36 for carrying pipes 15 between a tilted feed table 37 and respective containers 4b located at a combination load zone/temporary storage zone 38. The feed table 37 may be similar to the above described feed table 17, and the electromagnets 36 may be similar to those magnets 22 described above. The zone 38 is directly accessible by the storage/retrieval crane 2 which may deposit containers at such zone or retrieve them therefrom, particularly when the tilting load/unload crane 35 is in a vertical, i.e. withdrawn, condition.

As in the case of the station 3a, the computer 6 also controls the load/unload station 3b.

Turning to the storage/retrieval crane 2, such crane is an overhead crane of the gantry type having a main girder 40 supported by legs 41 which are in turn mounted on elongate feet 42. Trucks or wheel assemblies 43 support the gantry storage/retrieval crane 2 on rails 44 that preferably extend the length of the yard 5. Under control of the computer 6, then, the storage/retrieval crane 2 preferably is movable along at least substantially the entire length of the yard 5. If desired, the storage/retrieval crane 2 may be other than a gantry type, for example of the bridge type whereby the main girder 40 would be supported on overhead rails in a manner similar to the overhead load/unload crane 16 mentioned above.

The main girder 40 preferably is supported in a position that is higher than the load/unload cranes 16, 35 so that the end portions 40a, 40b of the main girder may travel above such load/unload cranes as the storage/retrieval crane 2 travels along the yard 5. The storage/retrieval crane 2 also includes a trolley 45 mounted on the main girder 40 to travel therealong and a load frame 46 vertically movable with respect to the trolley and supported therefrom by a stabilized reaving system generally represented at 47. The load frame 46 includes a grab mechanism capable of grabbing respective containers 4 to hold the same to the load frame in the manner shown, for example, in FIG. 1. Due to the height of the main girder 40 and the extending of the end portions 40a, 40b with respect to the load/unload stations 3a, 3b the trolley 45 and load frame 46 may be moved not only over the yard 5 for picking up or depositing containers 4 but also to the temporary storage zone 28 and to the load zone/temporary storage zone 38 for picking up and depositing containers there.

Further to improve efficiency of the storage and retrieval system 1, a support mechanism 50 is associated with each foot 42 of the storage/retrieval crane 2. Each support mechanism 50 may support one or more containers 4 thereon to transport the same along the length of the yard 5 as the crane 2 moves along the rails 44. For example, each support mechanism 50 includes the elongate foot 42 at the bottom of the crane leg 41 and a pair of pads 51, 52 on which a container may be placed in horizontal position, as is illustrated in FIG. 1. The feet 42 may be tapered, as is shown, for example to conserve material while maintaining adequate strength, and, therefore, the pad 52 may be somewhat higher than the pad 51 so that the container supporting surfaces of the respective pads are in a common horizontal plane. One or more of the wheel assemblies 43 may be larger than would otherwise be necessary so as to provide adequate capacity to support the additional weight of loaded containers carried on respective feet 42. If desired, additional locking mechanism, etc. (not shown) may be associated with or substituted for the respective pads 51, 52 to help secure and/or stabilize respective containers 4 thereon.

Exemplary operation of the storage and retrieval system 1, briefly, is as follows. Pipes 15 are received on the feed table 17, say from a pipe mill at which pipes continuously are manufactured. At the load/unload station 3a, the load/unload crane 16 loads the pipes from the feed table 17 into respective containers 4a. The shuttle cars 25 carry containers 4a that are loaded with pipes to one of the temporary storage zones 28 on either side of the load/unload crane 16 for pick-up by the storage/retrieval crane 2. Additional shuttle cars 25 (not shown in FIG. 1, but seen in FIG. 11, for example), which have been supplied with empty containers 4a by the storage/retrieval crane 2, bring the empty containers into line with the load/unload crane 16 as loaded containers are moved to one of the temporary storage zones 28. In this way the load/unload station 3a, and particularly the load/unload crane 16, may operate in a substantially continuous efficient manner that is somewhat independent of the positioning of the storage/retrieval crane 2.

The storage/retrieval crane 2 supplies the shuttle cars 25 located at a temporary storage zone 28 of the load-/unload station 3a with empty container 4. The storage/retrieval crane 2 also picks up and removes loaded containers 4 from a temporary storage zone 28. For example, two such containers 4 may be loaded by the trolley 45, load frame 46 and reaving system 47 onto one of the crane feet 42 and a third such container 4 may be held by the load frame 46. Then, the storage/retrieval crane 2 may move along the rails 44 to a position proximate a storage location for the transported containers. There the storage/retrieval crane 2 stores the containers 4 by stacking the same on or above respective support footers 10.

As the storage/retrieval crane 2 picks up and delivers containers 4 with respect to the load/unload station 3a, so, too, does the crane 2 pick up and deliver containers with respect to the load/unload station 3b. There, the tilting load/unload crane 35 may load pipes into respective containers, which have been supplied to the load zone/temporary storage zone 38 by the crane 2; and the crane 2 may pick up such loaded containers from such zone 38 for delivery to and storage at respective locations in the yard 5. The speed with which pipes 15 can be loaded from the table 37 to containers 4 at the load-/unload station 3b is somewhat slower than operation of the load/unload station 3a. Accordingly, such station 3b may be used in conjunction with heat treating, finishing, repair or like equipment at the pipe mill or manufacturing facility, i.e. at such processing areas at which material flow rates may be slower than in the pipe manufacturing area.

Although operation of the load/unload stations 3a, 3b has just been described with respect to loading pipes into containers 4, it will be appreciated that such load-/unload stations 3a, 3b may be operated in a reverse manner. Specifically, such stations may be operated to withdraw pipes from respective containers; to deliver such pipes to a feed table 17, 37; and to deliver via such feed tables and possibly other equipment (not shown) such pipes for further processing, for loading onto a transport vehicle, etc. Moreover, if desired, the storage/retrieval crane 2 may be operated to transport respective containers with respect to a transport vehicle, such as a truck, that would pull into a loading zone (not shown) appropriately aligned with the storage/retrieval crane 2.

The aforesaid and below described operation is monitored and controlled by the computer 6 which may be a conventional device programmed by a person of ordinary skill in the art to carry out the monitoring, controlling, coordinating, data storage, and overall automating of the system 1 disclosed herein in accordance with the preferred embodiment and best mode of the invention. Such computer 6 may be of the distributed intelligence type whereby separate subcontrol is effected at the individual load/unload stations 3a, 3b, at the storage/retrieval crane 2, and elsewhere, as may be desired; the whole, though, being under master control of the computer 6, as will be described in greater detail below. Suffice it to say, here, though, that the computer monitors respective containers at the load/unload station 3a and monitors position and controls movement of the shuttle cars 25 there. The computer 6 also monitors and controls the load/unload crane 16 and preferably the pipes received on feed table 17. Likewise, the computer 6 monitors and controls the load/unload station 3b to determine which container(s) is (are) at the zone 38, the pipes received on the feed table 37, and position and movement of the tilting load/unload crane 35 to load pipes into containers 4 (or to remove pipes from such containers). Further, the computer 6 monitors position and controls movement of the storage/retrieval crane 2 along the rails 44; of the trolley 45 and reaving system 47 to pick up and to place respective containers 4 where desired, for example with respect to the support mechanism 50, zones 28, 38, storage locations in the yard 5, and so on. Such monitoring by the computer 6 may be effected utilizing various transducers and/or transponders that provide input information to the computer regarding a given monitored parameter and control may be effected by control of conventional devices, such as relays, analog devices, and so on. Power equipment (not shown, but of conventional design), then, ultimately is the mechanism controlled by the computer 6 to effect desired operation of the storage and retrieval system 1.

Turning now to FIGS. 2, 3 and 4, additional features of the storage and retrieval system 1 are shown. In FIG. 2 are illustrated vertical columns identified a-v of containers 4. Containers 4 at columns a and b are supported on respective shuttle cars 25 at a load/unload station 3a, and the containers 4 in columns u and v are on tables 59 at load/unload station 3b. In columns c and t, which are outside the crane legs 41 and in a plane, relative to the plane of the drawing, behind or in front of the containers illustrated in columns a, b, u and v, are empty containers 4 stacked proximate the respective load/unload stations 3a, 3b for delivery thereto for loading. The containers 4 in columns d-s are stacked five high providing a high density storage in the yard 5. The number of containers so stacked will be a function, for example, of the stability of respective columns and safety; the maximum number of containers in a given columnar stack, accordingly, may be altered. The columnar stack height, too, is governed by the height of the storage/retrieval crane 2 such that adequate space above the stacks must be provided to permit passage of at least the load frame 46 and preferably such load frame while carrying a container. Space 60 is provided between columns c and d and columns s and t for the crane legs 41 and feet 42 to pass along rails 44 while such feet are carrying on pads 51, 52 one or more containers.

The manner in which the trolley 45 is mounted on the main girder 40 is seen in FIG. 3. The reaving system 47, which may be of a known type, includes one or more cables 62, pulleys 63 and cable drums 64 cooperative in response to power supplied by motive means (not shown) under control of the computer 6 to raise and to lower the load frame 46 while maintaining substantial stability of the load frame and any container load carried thereby with respect to the trolley 45. The manner in which the reaving system 46 can lower the load frame 46, including a container 4 held thereby, in the narrow space between adjacent vertical columns of stacked containers is illustrated in FIG. 4 where the extended reaving is shown in solid lines and the withdrawn reaving is shown in phantom lines. It will be appreciated that the stability with which the carried container is maintained in alignment with the trolley 45 when in the raised position shown in FIG. 3, is substantial, such that there is only nominal relative movement between the carried container and trolley during movement of the storage/retrieval crane 2 along rails 44.

A work house or operator's cab 70 is supported by the trolley 45. The trolley 45 itself extends in cantilever fashion out from the main girder 40, rolling along the latter on wheels or rollers 71–73. Moreover, the main girder 40 is supported from the vertical gantry legs 41 by cantilever arms 74. The length or extent of the arms 74 and of the trolley 45 are such that the load frame 46 is adequately displaced from the legs 41 to carry containers 4 fully loaded with maximum expected length pipes 15 in a balanced center of gravity manner with adequate clearance of the gantry legs 41 in the manner shown particularly in FIG. 3.

Under control of the computer 6, the storage/retrieval crane 2 may be operated in a completely automatic mode to locate container positions or positions for containers, to pick up or to deposit containers at such positions, including picking up and depositing containers with respect to the support mechanisms 50, and so on. An operator in the cab 70 may monitor operation of the storage/retrieval crane 2 and/or other portions of the storage and retrieval system 1, and, if desired, such operator may exert manual control or override of such operation or a portion thereof.

At each end of each storage/retrieval crane foot 42 is a shock absorber 75, 76. Such shock absorbers may be used to limit movement of the crane along the rails 44 by, for example, abutment with a stop 77 seen in FIG. 3. However, one such shock absorber, say the shock absorber 76, may be used to limit the maximum proximity that the storage/retrieval crane 2 can reach with respect to another storage/retrieval crane 2', a portion of which is seen in FIG. 3. Both such storage/retrieval cranes 2, 2' (which may be referred to below collectively as crane 2) may be used independently to store and retrieve material in the above described manner or to operate in concert to maximize efficient operation of the storage and retrieval system 1. The computer 6 is operative to control both such storage/retrieval cranes as is described herein.

Turning now to FIGS. 5, 6 and 7, a typical container 4 is shown. The container 4 may be formed by a plurality of metal beams, channels, strips, etc., that are securely fastened together, for example by welding or other fastening technique. Each container is generally of U-shape cross section as is seen in FIG. 6 to accommodate pipes 15 of various lengths that may fall within the boundaries limited by the container or even overextend the ends 80, 81 of the container. If desired, plural sloped guide bars 82, 83 may be fastened in the container, as is seen in FIG. 6, to guide the pipes therein to a preferred alignment pattern helping to maintain stability of the pipes as well as linear alignment thereof in the container 4.

At the bottom of each container are plural, preferably four, bottom support pads 84, two on each side of the container, for concentrating the weight of the container on or above respective support footers 10. The bottom support pads 84 may be attached to the container 4 by angle braces 85 (FIG. 6). Moreover, at the top of each container, aligned above the bottom support pads 84, are a corresponding number of automatic alignment guides 86. The guides 86 may be attached to the container side walls 87 by angle brackets 88. The alignment guides 86 include a trapezoidal cross section protrusion 90 and a triangular cross section projection 91 both of which are cooperatively alignable and insertable into guiding recesses 93 of the bottom support pads 84 of another container 4. The cooperative relatively accurately fitting, i.e. due to the sloping side surfaces of the protrusions 90, 91 and guiding recesses 93, facilitate aligning one container 4 over another and placement thereof into secure stacked relation to form the various columnar stacks, e.g. as is illustrated in FIGS. 1–4. If desired, other types of automatic alignment mechanism may be employed to guide respective containers into alignment with each other and to help assure secure integrity of a stacked plurality of containers. The illustrated arrangement, however, utilizes the bottom support pads 84 both for the automatic alignment function of stacked containers and concentration of force on the support footers 10 that substantially distribute force over the entire floor of the yard 5.

Each container 4 is uniquely identified by a passive transponder 100. Straps 101 may be used to secure the transponder container 102 to one of the vertical struts 103 of one container side wall 87. The container 102 preferably is of plastic or like material that permits electromagnetic signals to pass therethrough. The container 102 may be opened to provide access to a plurality of switches 104. The switches 104 may be adjusted in a specific pattern of on/off conditions to cause the transponder 100 to output a unique digital type signal upon being energized remotely. Such unique digital signal, which may be serial digital information, for example, uniquely identifies the particular container 4 to which the transponder is attached.

The preferred form of the passive transponder 100 includes in the container 102 a receiving antenna or coil capable of receiving an electromagnetic signal, such as a magnetic flux signal, produced by a transmitter/receiver 110 or 111, both of which are mounted on the load frame 46. Such signal energizes circuitry in the passive transponder 100 causing the latter to develop a radio frequency signal that is digitally encoded according to the setting of the switches 104. The radio frequency signal is received by that transmitter/receiver 110, 111 that is more proximate the passive transponder 100. The receiver digitally encoded radio frequency signal, then, is coupled via the respective transmitter/receiver 110, 111 to the computer 6 for identifying the particular container 4.

The passive transponder 100 is mounted in a location offset from the center of the container 4, i.e. closer to one axial end of the container than the other and is mounted at one side of the container. Therefore, the transmitter/receiver devices 110, 111 can be mounted on load frame 46 in relatively far spaced apart locations for alignment with the respective passive transponder 100, on the one hand, while, on the other hand, avoiding interference with each other. Specifically, by avoiding such interference, a sensing by the computer 6 of which transmitter/receiver 110, 111 has detected a passive transponder 100 will represent the particular facing direction of the container 4. Such information may be used by the computer 6 to help confirm identity of the container, or that the finished end of the pipe in the container is facing in the proper direction for expeditious delivery to subsequent processing equipment, having stored information as to the particular facing direction of the container the last time such container had been carried by the load frame 46, for example.

A similar identification/information type system of passive transponders 100 and transmitter/receivers, such as those shown at 110 and 111, may be employed for other purposes in the storage and retrieval system 1. For example, such passive transponders 100 may be mounted on or within the yard floor 112 along one or both rails 44. With each such transponder 100 uniquely identifying a specific location along the path of the respective rails, that information may be sensed by a transmitter/receiver carried on one or both feet 42 to provide information to the computer 6 of the exact location of the storage/retrieval crane 2 in the yard 5. Likewise, the location of the trolley 20 of the load/unload crane 16 and of the shuttle cars 25 may be monitored using such a passive transponder and transmitter/receiver system providing respective information to the computer 6. However, it will be appreciated that other types of transducer and transponder systems may be used in the storage and retrieval system 1 for obtaining position information, container identification information, and the like.

In FIG. 8 an exemplary pipe manufacturing plant 150 utilizing the storage and retrieval system 1 in accordance with the present invention is illustrated. For example, the plant 150 includes pipe manufacturing equipment 151, a further processing line 152, a repair mill 153, a finishing mill 155, and a pipe storage and retrieval system 1 in accordance with the present invention utilizing two storage/retrieval cranes 2, 2'. The storage and retrieval system 1 also includes several load/unload stations that are specifically dedicated for loading or for unloading pipes with respect to containers 4. Manufacturing equipment 151 may be extruding or other type that continuously manufactures pipes which are delivered to the storage and retrieval system 1 for storage in the yard 5. Pipe from the storage yard or transported from one of the other facilities associated with the plant 150 may be transported by a respective storage/retrieval crane 2, 2' to the processing line 152 where the pipes are further processed, e.g., heat treated, according to manufacturing requirements. At the finishing mill 155 pipes may be finished according to specifications, for example, by threading, reaming, cutting, etc., and is transported by means not shown to a further storage area, shipping containers or vehicles, etc. Alternatively, if desired, such finished pipes may be returned to containers 4 for continued storage in the main storage yard 5. Damaged pipes may be transported via the storage and retrieval system 1 to the repair mill 153 where damage may be repaired. Such damage frequently occurs to the pipe ends, which may be cut off at the repair mill and the pipes subsequently refinished, either at the repair mill or at a finishing mill 155. Scrap cut off at the repair mill 153 may be saved and reused at the manufacturing equipment 151 or otherwise may be disposed.

The storage and retrieval system 1 includes three types of load or unload stations, each of which is preferably dedicated to loading or unloading pipes with respect to containers 4. Where the highest flow of material is encountered at the output from the manufacturing equipment 151 is a loading station 3a of the type described above. Where there is a relatively slower flow rate of material expected, say at the processing line 152 or finishing mill 155, for example, are load/unload stations 3b' and at the repair mill 153 where flow rate is slowest are load/unload stations 3b''. The principal difference between the load and unload stations 3b' and 3b'' is the direction of slope of the respective tables 37—that associated with unload stations 3b', 3b'' sloping away from the unload crane and that of the load stations 3b', 3b'' sloping toward the load crane. If desired, however, the tables 37 may be adjustable to change the direction of slope or to change the slope angle magnitude. This ability provides an added versatility to the unload or load station 3b and, if desired, may also be employed with respect to any of the load or unload stations of the storage and retrieval system 1.

At each end 165, 166 of the storage yard 5 is a maintenance bay 167, 168 where the respective storage/retrieval cranes 2, 2' can be serviced. While one such crane is undergoing servicing, the other may be employed to run the length of the yard 5 for complete functioning of the storage and retrieval system 1. Along the rails 44 are seen several of the plurality of passive transponders 100 used to monitor accurately position of the respective storage/retrieval cranes 2, 2'. At the sides 169, 170 of the storage yard 5 outside the rails 44 are a plurality of storage locations, such as those shown at 171, where one or more preferably empty containers 4 may be stacked for subsequent use.

Referring now to FIGS. 9-12, the load/unload station 3a is illustrated in detail. The bridge or trolley 20 is comprised of a pair of bridge girders 180, 181 connected by wheel or truck assemblies 182. Such wheel assemblies 182 are movable along the girder rails 21, which are supported on vertical posts 183. An electric motor 184 mounted on the trolley 20 has output shafts 185, 186 connected to turn cylindrical drive drums 187, 188. Strung around those drums are cables or wires 189, 190, which also are connected between respective braces 191-194. Turning of the drive drums 187, 188 pulls the trolley 20 along the rails 21.

Also mounted on the bridge trolley 20 is a further electric motor 200 connected via a gear assembly 201 to turn lift drums 202, 203. Cable sets 204, 205 are wrapped around the lift drums and around respective pulley sets 206, 207 to lift or to lower the load frame 23 in response to wrapping or unwrapping of cable with respect to the lift drums 202, 203. At the left side of FIG. 9 the bridge trolley 20, load frame 23 and one of the magnets 22 are shown aligned over the sloped table 17 picking up relatively large diameter pipes 15. Between the load frame and magnets is a tilt control assembly 210 for tilting the magnets with respect to the load frame so that the surface of the magnets confronting the pipes runs parallel with the upper edges of the pipes to assure secure grasping of the pipes. Overhang stops 211, 212 on opposite sides of each magnet prevent the pipes from rolling off the magnet. At the righthand side of FIG. 9 the bridge trolley 20, load frame 23 and magnets 22 are shown in phantom lines depositing relatively small diameter pipes into a container 4; at the lefthand side the magnets 22 are holding relatively large diameter pipes.

As is seen in FIG. 10 six magnets 22 are supported from the load frame 23. The magnets are so arranged at spaced apart locations such that for the smallest expected length of pipes expected to be handled by the crane 16 at least two magnets would engage such pipes. Electrical pigtails 213 supply power from a source (not shown) under control of the computer 6, which controls a conventional power controller 214 for energizing the magnets 22 at power levels commensurate with the size and quantity of pipes being carried by the magnets. The power controller 214 may be a conventional solid state phase control circuit or other circuit for adjusting power input to the magnets in response to input from the computer 6. Preferably the level of such energization is adequate, based on pipe weight, diameter, wall thickness, and possibly other parameters, to cause a magnetic attraction force that will lift a known number or layer of pipes, preferably one complete layer, spanning the width of the magnets and/or the respective container to which delivered or from which received. The noted pipe parameters on which such power control is based may be manually input to the computer and/or may be automatically input, e.g., by the manufacturing equipment 151, weight gage 302, and stored in the memory 301 for use by computer 6. Moreover, slide guides 215 help guide the load frame for vertical movement with respect to the bridge trolley 20 as the cable sets 204, 205 are wound and unwound. In FIG. 10 the load frame 23 and magnets 22 are shown in solid lines carrying pipes above a container 4, which is supported on a shuttle car 25, and in phantom lines recessed in such container depositing or picking up pipes with respect thereto. The rails 26 on which the shuttle cars 25 travel may be recessed relative to the major extent of the floor of the storage yard 5 to minimize the required height of the crane 16 and, therefore, the required height of the storage/retrieval crane 2 for clearance above the crane 16.

The shuttle car system 220 preferably has six shuttle cars 25 located two each on three respective sets of parallel rails 26. If desired, however, more or fewer rail sets and/or shuttle cars may be employed. The objective of the shuttle car system 220 is to expedite flow of material with respect to the crane 16 and the storage/retrieval crane 2 by maintaining a ready reserve of empty containers 4, for example, for loading by the crane 16 and by promptly transferring loaded containers to a temporary storage zone 28 on either side of the crane 16 facilitating and expediting access to such containers by the storage/retrieval crane 2 without requiring the storage/retrieval crane to pick up containers from within the boundaries of the crane 16 between the overhead crane rails 21. The shuttle car system 220 also enables center of gravity alignment of containers with respect to the center of gravity of the pipes to be loaded therein by the crane 16 as will be described further below.

The computer 6 controls operation of the shuttle car system 220. Accordingly, the computer 6 keeps track of positions of the respective shuttle cars 25 and whether or not there is a loaded or unloaded container 4 thereon. Electric motors (not shown) controlled by the computer 6 mounted on respective shuttle cars move the same between respective temporary storage zones 28 and the load zone 27 of the crane 16. Exemplary operation of the shuttle car system 220 would initially place three unloaded containers in the load zone 27 with three empty containers on shuttle cars located in the temporary storage zone. The crane 16 would load one container. When such container has been loaded, the crane 16 would load the next container, and then the next. In the meantime, the shuttle car(s) containing loaded containers would be moved to the free area in a temporary storage zone 28 for pick-up by the storage/retrieval crane 2. The crane 2 would also place an empty container on the then available shuttle car. During such time, the other shuttle car on the same track as the first mentioned one would be moved into the load zone 27 bringing an empty container there for loading by the crane 16. The free shuttle car 25 at the temporary storage zone 28 would then be loaded by the storage/retrieval crane 2 with an empty container for subsequent movement into the load zone 27, and so on. Other types of operation of the shuttle car system 220 to maintain desired operational efficiency of the crane 16 and storage/retrieval crane 2 may be employed as desired.

An important feature of the invention is the ability to align the center of gravity of an empty container 4 with the center of gravity of the pipes 15 intended for loading therein. Accordingly, a guide 221 is provided relative to the feed table 17, and it is intended that each pipe passing along the feed table to the crane 16 will have an end aligned in close proximity to the guide 221. With information concerning the length of the pipes, for example based on the cut-off lengths in the manufacturing equipment 151, the computer 6 may control one or more shuttle cars 25 to move the same such that an empty container intended to be loaded with such pipes has its respective center of gravity aligned with that of the pipes. For example, the center of gravity 222 of the container 4 shown at the bottom of FIG. 11 is offset from the centerline 223 and center of gravity of the containers in the middle and upper portion of the FIG. 11 illustration. Thus, the container 4 having the center of gravity 222 is prepared to receive relatively short pipes 15a, whereas the other two containers aligned beneath the crane 16 are prepared to receive pipes 15b having a maximum length of which the crane 16 is capable of handling. With the centers of gravity of the container and the pipes therein so aligned, safety and stability in handling the loaded containers, for example by the storage/retrieval crane 2, the shuttle cars 25, and any other means is improved over otherwise relatively unbalanced arrangement of pipes in containers.

Figure 13:
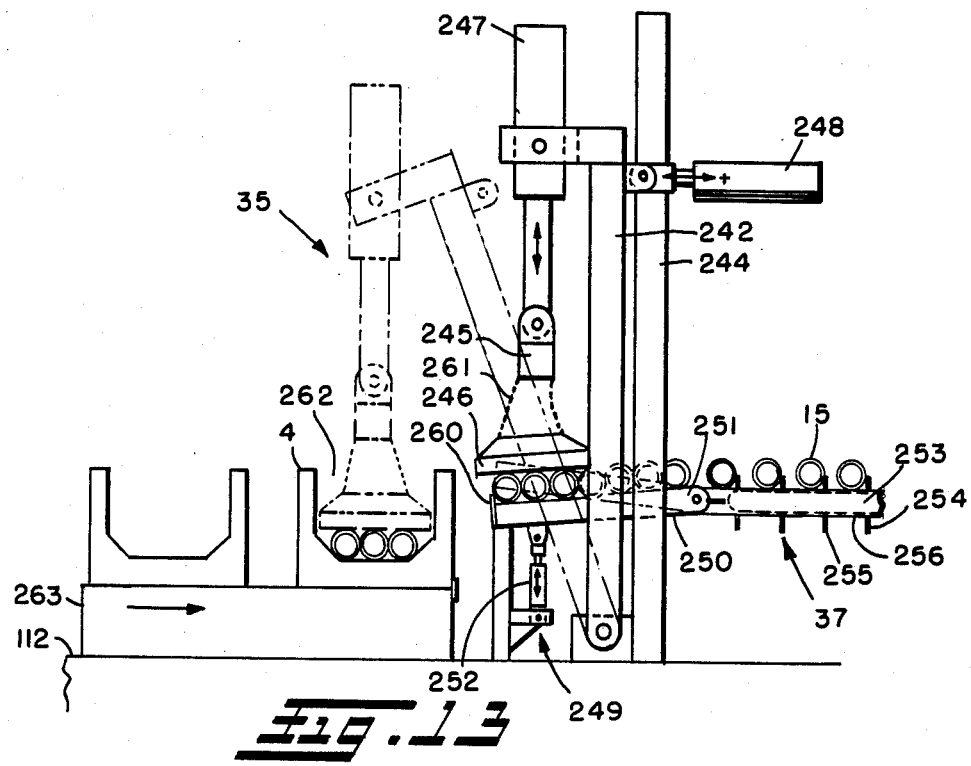
FIG. 13 is a front elevation view of the tilt crane load station of FIG. 12.

Turning briefly to FIGS. 12 and 13, the tilting load-/unload crane 35 used in stations 3b' and 3b", for example, includes a main horizontal support beam 240, tilting vertical supports 241, 242, fixed vertical supports 243, 244, a load frame 245, plural magnets 246 and hydraulic cylinders 247. The crane 35 also includes a further pair of hydraulic cylinders 248 (only one of which is shown) and table tilting apparatus 249 for tilting the end of the feed table 37. The feed table 37, accordingly, has a forward tiltable extension 250 that is pivotable about a pivot point 251 under power of an hydraulic cylinder 252. The feed table 37 also has a rearward portion 253 that includes a conveyor type indexing mechanism generally represented at 254 with plural divider tabs 255 mounted on an endless conveyor belt 256 driven by a motor (not shown).

Pipe delivered to a portion of the feed table from the processing line 152, for example, is conveyed by the conveyor indexing mechanism 254 to the tiltable extension of the feed table 37. The pipes roll down that tiltable extension 250, being limited in rolling by a stop 260. Under control of the hydraulic cylinder(s) 248 the tilting vertical supports 241, 242 are pulled to their withdrawn position (shown in solid line in FIG. 13). The load frame 245 is lowered under control of the hydraulic cylinders 247 until plural magnets 246 grasp plural pipes 15. The magnets may be suspended from the load frame 245 by chains 261 permitting flexibilty in the magnet mounting and alignment of the magnet with plural pipes the upper surfaces of which are in a nonhorizontal plane due to the tilting of the table extension 250. The hydraulic cylinders 247 then lift the load frame 245, the magnets 246, and the grabbed pipes 15. The hydraulic cylinder(s) 248 tilt the vertical supports 241, 242 until the magnet aligns above the open top 262 of a container 4 located on a load table 263 above the yard floor 112. After the pipes have been placed in such container 4 (or grasped by the magnets 246 therein), the hydraulic cylinders 247 are operated to withdraw the magnets from the container, and the hydraulic cylinders 248 are operated to withdraw the tilted supports 241, 242 (as are shown in phantom in FIG. 13) back to vertical position for grabbing the next load of pipes (or placing the pipes removed from the container 4) with respect to the table 37. When loading (or unloading) of the container 4 has been completed, such container may be removed from the load table 263 by the storage/retrieval crane 2, and the next container, shown to the left portion of the load table 263 in FIG. 13, may be moved into position for loading (or unloading) by the load/unload crane 35.

Preferably the center of gravity alignment feature mentioned above with respect to the load/unload station 3a and crane 16 is included in the crane 35 when the latter is used to load pipes into containers 4. More specifically, one end of each pipe would be aligned with a guide, and the containers 4 would be placed by the storage/retrieval crane 2 on the load table 263 at a position such that the axial center of gravity of the containers will align with the axial center of gravity of the pipes intended for loading therein. Moreover, the number of magnets 246 and the spacing thereof are such that at least two of the same will grab each pipe being carried by the load frame 245 and magnets 246.

Figure 15:
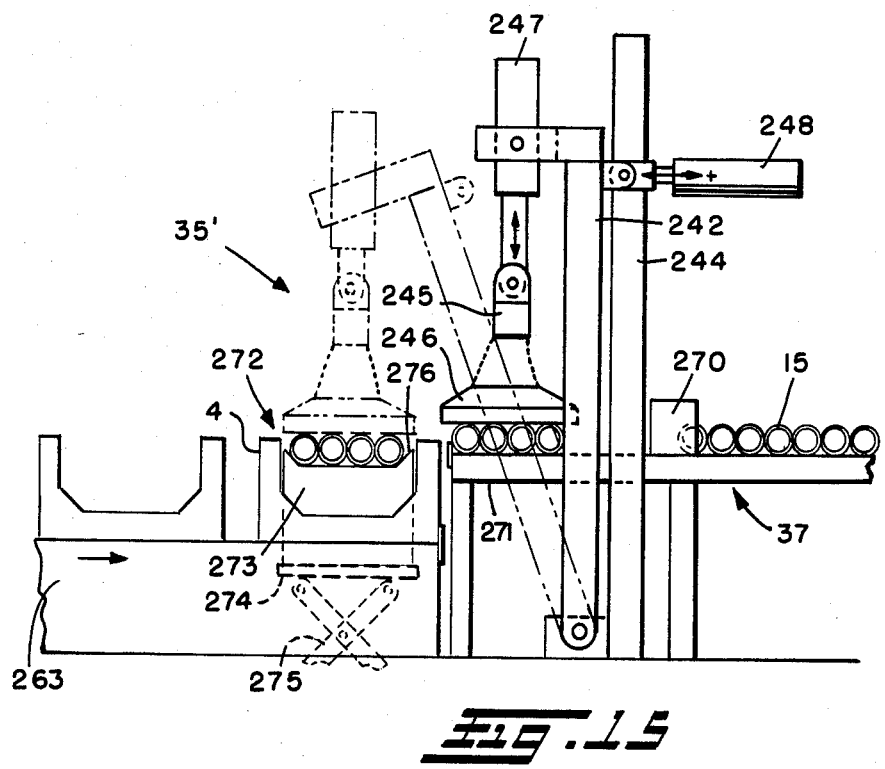
FIG. 15 is a front elevation view of the modified load crane station of FIG. 14.

Turning now to FIGS. 14 and 15, a modified load/unload crane 35' is illustrated. The crane 35' is similar to the crane 35 described above with reference to FIGS. 12 and 13. However, in crane 35' there is associated with the feed table 37 an escapement type indexing mechanism 270 which controls how many 15 are permitted to roll down the permanently tilted table extension 271 to the zone where the pipes are picked up by the magnets 246. As is seen in FIG. 14, only four magnets are mounted on the load frame 245. However, if desired, more or fewer magnets may be employed depending on the length of the pipes, the size of the pipes, and the weight of the pipes intended to be carried by the crane 35'. It is desired, though, that when the crane 35' is used, at least two magnets will hold a given length of pipe and, therefore, the number of magnets and their spacing will be a function of the shortest and longest length of pipe intended to be carried by the crane 35'.

Another feature of the crane 35' is an adjustable artificial bottom 272 for the containers 4 to provide a constant drop-off height for the crane 35'. More specifically, the artificial bottom mechanism 272 includes a plurality of load bars 273 attached to a common mounting table 274, which in turn is vertically movable by a scissors jack mechanism 275. The load bars 273 fit through open areas in the container 4. The top surface 276 of the load bars provides an artificial bottom for the container 4. Therefore, when the crane 35', and particularly the magnets 246, carry a load of pipes 15 to the container 4, such magnets do not have to be lowered into the container. Rather, the scissors jack mechanism 275 is operated to raise the load bars 273 providing an artificial bottom for an initial load of pipes 15 to the container 4 near the top of the container. As the crane 35' pivots back to pick up the next load of pipes from the table area 271, the scissors jack mechanism 275 lowers the load bars 273 so that the drop height of the next row/load of pipes is the same as that for the first row, and so on. The scissors jack mechanism 275, mounting table 274 and load bars 273 are mounted within appropriate portions provided therefor in the container load table 263. Operation of the crane 35' may be similar to that described above with reference to the crane 35 in connection with FIGS. 12 and 13.

It will be appreciated that either of cranes 35 or 35' may be used at the respective stations 3b' and 3b'' in the storage and retrieval system 1 illustrated in FIG. 8, for example. An advantage to the tilting crane over the bridge crane 16 is that the storage/retrieval crane 2 may move directly into the load zone of such tilt crane to deliver and to receive containers 4 without requiring a shuttle car system. However, the flow rate of material that can be handled by such tilt crane load/unload stations without such a shuttle car system would be somewhat less than that capable of being handled by the crane 16. If desired, though, it is possible to include in conjunction with the tilt crane 35 or 35' a shuttle car system of the type described above or of a modified type having, for example, fewer shuttle cars and/or the ability to handle fewer containers, depending on the material flow requirements of the particular load/unload station at which the same is employed. It is intended, too, that the various feed table arrangements and other features of the several load/unload cranes and stations described herein may be interchangeably used in the system. Selection may be based, for example, on material size and flow rates, and other operational constraints. It will also be understood that the primary difference between the stations 3b' and 3b'' is the capacity of the same to handle pipes at anticipated flow rates; therefore, for the faster flow rates, for example, the shuttle car system disclosed, or an abbreviated one, may be used to expedite material flow, etc.

Referring to FIG. 16, a block diagram 300 depicting the interrelationship of the computer 6 to various other portions of the storage and retrieval system 1 is shown. The computer 6 has a memory 301 for providing program information to the computer 6 and for storing information obtained via transducers and/or other means associated with the storage and retrieval system 1 and the computer 6 itself. For example, the transponders 100 provide inputs to the computer 6 when the load frame 46 of the storage/retrieval crane 2 is aligned with a respective container. Depending on whether transmitter/receiver 110 or 111 is aligned with a respective transponder 100, one of the same will deliver to the computer 6 a particular digital code identifying the specific transponder and container combination. Likewise, transmitter/receiver systems 110', 111' mounted, for example, on the feet 42 of the storage/retreival crane 2 monitor respective transponders 100' located in the floor 112 of the yard 5 to provide to the computer 6 information indicating the exact positioning of the storage/retrieval crane 2. It is noted here that use of transponders 100 and transmitter/receiver combinations 110' and/or 111' provides accurate information to the computer 6 of the discrete positions of the storage/retrieval crane 2. Locations between such discrete positions also may be further identified by tachometer readings from the wheels on the trucks 43. The transponders 100, though, should be positioned adequately close to obtain the desired accuracy of storage/retrieval crane 2 positioning to assure accurate placement of the load frame 46 to pick up and/or to deliver containers.

A weight gauge 302 also provides to the computer 6 information concerning the weight of any container (and load, if any, carried thereby) each time such container is picked up by the load frame 46 of the storage/retrieval crane 2. Such weight gauge 302 may be a conventional strain gauge system mounted with respect to the trolley 45, load frame 46, reaving system 47, etc. The weight information may be used by the computer to help confirm identification of a given container, to help confirm whether or not part of a load intended to be placed in a container has been removed, etc. The weight information also may be used to determine the quantity of waste or scrap material created when pipe is repaired at the repair facility 153, for example by weighing a container and load therein prior to delivery to such repair facility and by using the same container and reweighing the container with such load received after repair. The weight information also may be used to confirm that all of the material expected to be received from the manufacturing equipment 151, processing line 152, etc., has properly been loaded into the container— this by comparing the actual weight with that expected based on pipe size, number of pipes, etc. expected to be delivered into the container. The weight information, further, may be employed to confirm the integrity of a given container; for example, if a brace portion of the container has broken and fallen away, the weight information may be used to detect the flaw.

A crane position control 303 and a crane load frame control 304 respond to signals from the computer 6 to control power equipment in the storage/retrieval crane 2 to control acceleration, deceleration, and velocity of the storage/retrieval crane 2 as it moves along the rails 44 to place the load frame with respect to a given container to pick up the same, or with respect to a given storage location in the yard 5, shuttle cars 25, load zone/temporary storage zone 38, etc., and also control acceleration, deceleration and velocity of the load frame 46 to pick up and/or to deposit a container. The load frame control 304 also includes means for operating the grab mechanism associated with the load frame 46 to grab or to release a container 4.

Information concerning the weight, length, diameter, and possibly other information, such as material, heat treating information, etc., is delivered as an input to the computer 6 from conventional means represented at 305. With such information available, the computer 6 may operate through the crane position control 303, for example, to place a given container 4 at a load/unlod station aligning the pipes and container centers of gravity. The computer 6 also may rely on such information to determine the quantity or number of pipes that are to be loaded into each container 4 at a load/unload station. With the information stored in memory 301 by the computer 6, the computer 6 effectively has a complete inventory of all pipes in the storage yard 5 and the exact location thereof. Accordingly, in response to a command input to the computer 6 from an automatic source or from a manual input, the computer 6 may print out the total inventory, may select and obtained a particular container from the yard 5, etc. Further, knowing the intended facing direction of a given container in the yard 5, for example, and the particular identifying information, such as from a transponder 100, of a specific container intended to be selected from the yard 5, the computer 6 upon receiving information from a transponder 100 of a container 4 that the load frame 46 is preparing to grab may check the facing direction of the container, the weight of the container, and the digital identifying information from the transponder 100. If part or all of such information does not agree with that expected, then a fault condition may exist. Manual override or checking of the condition then may be required.

At block 306 monitoring and control of the respective load/unload stations 3a, 3b, for example, is represented. Detectors at such load/unload stations detect the actual positions of load frames, magnets, trolleys, tilting supports, etc., and feed that information to the computer 6. The computer 6, in turn, controls accelerations, decelerations, speeds, positions, etc., at the respective load/unload stations. Moreover, with information available to the computer 6 concerning the pipe weight, length, diameter, etc., intended to be picked up by the respective load/unload cranes, the number of pipes to be indexed along a tilting table portion, the magnitude of magnetic flux or of energization of respective magnets, the number of magnets to be energized, etc., can be effectively controlled by the computer 6 to optimize operation and to conserve energy.

Exemplary overall operation of the storage and retrieval system 1 in a pipe manufacturing plant 150 (FIG. 8) now will be summarized. At start-up each of the storage/retrieval cranes 2, 2' takes up empty containers 4 from side storage areas 320 on opposite sides of the yard 5. For example, the load frame 46 of storage/retrieval crane 2 picks up a first empty container and places the same on one of the gantry feet 42 and repeats such action until two containers are on each foot 42 and one is suspended from the load frame. Thereafter, the crane 2 moves to deposit empty containers at the load/unload station 3a associated with the manufacturing equipment 151 ready for loading at such station. As containers are loaded at such station 3a, the crane 2 may pick up the loaded containers and deposit them at specific locations in the yard 5. in the meantime, the crane 2' may deposit empty containers at the load/unload station 3a associated with the manufacturing equipment 151. Moreover, crane 2' may, for example, transport loaded containers from the yard 5 or directly from the equipment 151 and load/unload station 3a to the load/unload station 3b' associated with the processing line 152. The crane 2 may be used to transport containers to the finishing mill 155 and/or to the repair mill 153. If one crane 2, 2' requires servicing, the same may be moved to one of the service bays 167, 168 for such servicing while the other crane 2, 2' continues to service the entire storage and retrieval system 1.

Further to improve efficiency in the system 1, in the event a container from the lefthand side (as seen in FIG. 8) of the yard 5 requires transporting to the righthand portion of the yard 5, a pitch/catch operation may be employed. Specifically, the particular container may be picked up by the crane 2 and deposited at a vacant location in the storage yard 5, either on the floor (having underlying support footers 10) or on top of a stack of containers where there is a vacancy. The crane 2 then moves out of alignment with such container and the crane 2' moves into alignment with such container to pick up the same. Thereafter, the crane 2' may transport the container to a desired location. Moreover, vacant locations in one or more stacks may be used as temporary or permanent storage locations for respective containers, as a given stack is reorganized, for example, or to facilitate accessing a container located below the top of a stack.

During the aforesaid operation, the computer 6 controls not only the cranes 2, 2', but also the various load-/unload stations coordinating overall operation of the storage and retrieval system 1 in an effort to optimize operation. To this end exemplary position, velocity and/or acceleration sensors 400–403 respectively provide inputs to the computer 6 representing respective parameters of the trolleys 45, 20, pivot crane 402 and shuttle cars 25 and transponders/transducers 100', 110' provide input regarding crane 2 position, etc. Other transducer and control equipment of conventional design and function may be used as well. The computer 6 may be a conventional one, including distributed intelligence stations, e.g., at the transducers 400–403, 110 and 110' being operative to monitor, coordinate, control, etc., generally as is described herein. To effect such monitoring and control the computer 6 may function according to a computer software program, which may be prepared by a person having ordinary skill in the art, to carry out the herein disclosed operation of the storage and retrieval system 1.

STATEMENT OF INDUSTRIAL APPLICATION

In view of the foregoing it will be appreciated that the invention is operable to effect storage and retrieval of pipes in an efficient and accurate manner. The invention is particularly useful on-line at a pipe manufacturing facility. Also, the invention may be employed to store and to retrieve other types of elongate material, such as bars, tubes, rods, etc., and features of the invention may be employed in other types of operations.

We claim:

1. An automated material storage and retrieval system comprising:
   a material loading means adapted to load material into a container at a first location to facilitate such storage at a secondary location; a storage/retrieval means for moving the container from the said first location to the said second location; and computer means for coordinating movement of the material loading means and said storage/retrieval means; said material loading means comprising transport means for transporting elongate members between said material loading means and respective containers, and guide means for aligning one end of such elongate members to facilitate transfer to the transport means, said computer means including means for storing in said memory information of the center of gravity of such elongate members, and means for controlling positioning of said containers for the transferring of elongate members with respect to said material loading means with at least approximate alignment of the centers of gravity of respective containers and elongate members.

2. An automated material storage and retrieval system, comprising a computer means adapted to control the system, said means including a memory; a storage/retrieval crane operable in a storage yard for storing material; the system further including a plurality of containers, each being capable of containing material for storage in the storage yard; and material loading means for at least one of loading and/or unloading the material with respect to said containers; said computer means including means of coordinating said storage/retrieval crane and said loading means; said material loading means comprising transport means for transporting elongate members between said material loading means and respective containers, and guide means for aligning one end of such elongate members to facilitate transfer to the transport means, said computer means including means for storing in said memory information of the center of gravity of such elongate members, and means for controlling positioning of said containers for the transferring of elongate members with respect to said material loading means with at least approximate alignment of the centers of gravity of respective containers and elongate members.

3. The system of claim 1 or 2, further comprising plural shuttle means for shuttling respective containers between one position for pick-up by said storage retrieval crane and another position for transfer of elongate material with respect to said material loading means.

4. The system of claim 3, said computer means including means for coupling the same to said shuttle means for monitoring and controlling said shuttle means.

5. An automated material storage and retrieval system comprising:
   a material loading means adapted to load material into a container at a first location to facilitate such storage at a secondary location; a storage/retrieval means for moving the container from the said first location to the said second location; and computer means for coordinating movement of the material loading means and said storage/retrieval means; said material loading means comprising a crane, magnetic grab means supported by said crane for holding elongate members, load frame means supported by said crane for mounting a plurality of said magnetic grab means in relatively spaced apart locations, conveying means for conveying elongate members between said material loading means crane and another location, aligning means for aligning one end of said elongate members, and a load station at which a container may be positioned for transfer of elongate members with respect to said material loading means, and said relatively spaced apart locations of said grab means and the location of said aligning means being related to cause plural grab means to align with the shortest anticipated elongate member expected to be picked up and held by said grab means from said conveying means.

6. An automated material storage and retrieval system, comprising a computer means adapted to control the system, said means including a memory; a storage/retrieval crane operable in a storage yard for storing material; the system further including a plurality of containers, each being capable of containing material for storage in the storage yard; and material loading means for at least one of loading and/or unloading the material with respect to said containers; said computer means including means for coordinating said storage/retrieval crane and said loading means; said material loading means comprising a crane, magnetic grab means supported by said crane for holding elongate members, load frame means supported by said crane for mounting a plurality of said magnetic grab means in relatively spaced apart locations, conveying means for conveying elongate members between said material loading means crane and another location, aligning means for aligning one end of said elongate members, and a load station at which a container may be positioned for transfer of elongate members with respect to said material loading means, and said relatively spaced apart locations of said grab means and the location of said aligning means being related to cause plural grab means to align with the shortest anticipated elongate member expected to be picked up and held by said grab means from said conveying means.

7. An automated material storage and retrieval system comprising:
a material loading means adapted to load material into a container at a first location to facilitate such storage at a secondary location; a storage/retrieval means for moving the container from the said first location to the said second location; and computer means for coordinating movement of the material loading means and said storage/retrieval means; said material loading means comprising a crane, magnetic grab means supported by said crane for holding elongate members, conveying means for conveying elongate members between said material loading means crane and another location, aligning means for aligning one end of said elongate members, and a load station at which a container may be positioned for transfer of elongate members with respect to said load means, shuttle means for moving a container with respect to said load station, control means for controlling movement of said shuttle means to align the approximate center of gravity of a container thereon with the approximate center of gravity of such elongate members to be transferred between said container and said conveying means while said ends of elongate members remain substantially aligned with respect to said aligning means.

8. An automated material storage and retrieval system, comprising a computer means adapted to control the system, said means including a memory; a storage/retrieval crane operable in a storage yard for storing material; the system further including a plurality of containers, each being capable of containing material for storage in the storage yard; and material loading means for at least one of loading and/or unloading the material with respect to said containers; said computer means including means for coordinating said storage/retrieval crane and said loading means; said material loading means comprising a crane, magnetic grab means supported by said crane for holding elongate members, conveying means for conveying elongate members between said material loading means crane and another location, aligning means for aligning one end of said elongate members, and a load station at which a container may be positioned for transfer of elongate members with respect to said load means, shuttle means for moving a container with respect to said load station, control means for controlling movement of said shuttle means to align the approximate center of gravity of a container thereon with the approximate center of gravity of such elongate members to be transferred between said container and said conveying means while said ends of said elongate members remain substantially aligned with respect to said aligning means.

9. An automated material storage and retrieval system, comprising a computer means adapted to control the system, said means including a memory; a storage/retrieval crane operable in a storage yard for storing material; the system further including a plurality of containers, each being capable of containing material for storage in the storage yard; and material loading means for at least one of loading and/or unloading the material with respect to said containers; said computer means including means for coordinating said storage/retrieval crane and said loading means; said storage retrieval crane comprising a gantry type crane including a trolley, a girder support means for supporting said trolley and along at least a substantial length of which said trolley may move, grab means supported by said trolley for holding a container, and mounting means for mounting said girder support means above said storage yard; said mounting means comprising leg means for supporting said girder support means above said storage yard, at least one leg means having elongate foot means for distributing the weight supported by said at least one leg means, and container support means for supporting at least one container on said elongate foot means.

10. The system of claim 9, wherein said containers are elongate, and said container support means comprises means for supporting said at least one container in at least substantially parallel relation to the elongate extent of said at least one foot means.

11. The system of claim 10, said leg means comprising two leg means, each having a respective elongate foot means and container support means.

12. The system of claim 11, each container support means being capable of carrying at least two containers while said storage retrieval crane moves along said storage yard and said grab means also is capable of holding a container during such movement of said storage retrieval crane.

13. The system of claim 12, said computer means including means for controlling said trolley and grab means accurately to place containers on and to remove containers from a container support means.

* * * * *